United States Patent

Romesburg et al.

[11] Patent Number: 6,160,886
[45] Date of Patent: Dec. 12, 2000

[54] METHODS AND APPARATUS FOR IMPROVED ECHO SUPPRESSION IN COMMUNICATIONS SYSTEMS

[75] Inventors: Eric Douglas Romesburg, Chapel Hill, N.C.; Jim Agne Jerker Rasmusson, Brosarp, Sweden

[73] Assignee: Ericsson Inc., Research Triangle Park, N.C.

[21] Appl. No.: 09/005,149

[22] Filed: Jan. 9, 1998

Related U.S. Application Data

[63] Continuation-in-part of application No. 08/852,729, May 7, 1997, which is a continuation-in-part of application No. 08/775,797, Dec. 31, 1996.

[51] Int. Cl.[7] .................................................. H04B 3/20
[52] U.S. Cl. ..................... 379/410; 379/390; 379/406; 379/409
[58] Field of Search ..................... 379/410, 411, 379/390, 406, 409; 370/288, 289, 286, 290

[56] References Cited

U.S. PATENT DOCUMENTS

| | | | |
|---|---|---|---|
| 4,577,071 | 3/1986 | Johnston et al. | |
| 5,157,653 | 10/1992 | Genter | 370/288 |
| 5,274,705 | 12/1993 | Younce et al. | |
| 5,283,784 | 2/1994 | Genter | 370/32.1 |
| 5,475,731 | 12/1995 | Rasmusson | |
| 5,561,668 | 10/1996 | Genter | 370/288 |
| 5,563,944 | 10/1996 | Hasegawa | 379/410 |
| 5,570,423 | 10/1996 | Walker et al. | 379/410 |
| 5,587,998 | 12/1996 | Velardo, Jr. et al. | 370/289 |
| 5,598,468 | 1/1997 | Ammicht et al. | 379/410 |
| 5,606,550 | 2/1997 | Jangi | 370/289 |
| 5,687,229 | 11/1997 | Sih | 379/410 |
| 5,812,537 | 9/1998 | Betts et al. | 370/286 |
| 5,825,753 | 10/1998 | Betts et al. | 370/289 |
| 5,909,489 | 7/1999 | Matt et al. | 379/406 |

*Primary Examiner*—David R. Hudspeth
*Assistant Examiner*—Daniel Abebe
*Attorney, Agent, or Firm*—Burns, Doane, Swecker & Mathis, L.L.P.

[57] ABSTRACT

Methods and apparatus for achieving echo suppression in communications systems include an echo suppressor, referred to herein as an AC-center attenuator, which attenuates the echo component of a communications signal by multiplying a portion of the communications signal by an appropriate scale factor. Specifically, the AC-center attenuator scales that portion of the communications signal lying within a sliding attenuation window. The attenuation window tracks the communications signal so that the AC-center attenuator suppresses the echo component while passing other signal components of interest (e.g., near-end speech and noise). The scale factor within the attenuation window, and the size of the attenuation window itself, are dynamically adjusted so that the AC-center attenuator introduces minimum signal distortion and few audible artifacts. The dynamic adjustment is carried out to provide a desired round-trip echo gain in a system in which the AC-center attenuator is implemented. Toward that end, a measure of the echo attenuation achieved by an echo suppressor (e.g., an adaptive echo canceler) is obtained by computing a ratio of first and second values, wherein the first and second values indicate energy levels in the echo suppressor output and input signals, respectively. Alternately, the echo attenuation achieved by a blockwise-updating echo canceler is obtained by computing a ratio of first and second values, wherein the first value indicates a level of energy in a set of update coefficients of the echo canceler and the second value indicates a level of energy in the echo canceler input signal. In each case, the computed ratio can be used to adjust the level of attenuation provided by a residual echo suppressor.

47 Claims, 7 Drawing Sheets

METHODS AND APPARATUS FOR IMPROVED ECHO SUPPRESSION IN COMMUNICATIONS SYSTEMS

CROSS-REFERENCE TO RELATED APPLICATIONS

This application is a continuation-in-part of U.S. patent application Ser. No. 08/852,729, filed May 7, 1997 and entitled "An Improved Echo Canceler for Use in Communications Systems", which is in turn a continuation-in-part of U.S. patent application Ser. No. 08/775,797, filed Dec. 31, 1996 and entitled "An AC-Center Clipper for Noise and Echo Suppression in a Communications System". Each of the above identified applications is incorporated herein in its entirety by reference.

BACKGROUND OF THE INVENTION

The present invention relates to communications systems, and more particularly, to echo suppression in bi-directional communications links.

In many communications systems, for example landline and wireless telephone systems, voice signals are often transmitted between two system users via a bi-directional communications link. In such systems, speech of a near-end user is typically detected by a near-end microphone at one end of the communications link and then transmitted over the link to a far-end loudspeaker for reproduction and presentation to a far-end user. Conversely, speech of the far-end user is detected by a far-end microphone and then transmitted via the communications link to a near-end loudspeaker for reproduction and presentation to the near-end user. At either end of the communications link, loudspeaker output detected by a proximate microphone may be inadvertently transmitted back over the communications link, resulting in what may be unacceptably disruptive feedback, or echo, from a user perspective.

Therefore, in order to avoid transmission of such undesirable echo signals, the microphone acoustic input should be isolated from loudspeaker output as much as possible. With a conventional telephone handset, in which the handset microphone is situated close to the user's mouth while the handset speaker essentially covers the user's ear, the requisite isolation is easily achieved. However, as the physical size of portable telephones has decreased, and as hands-free speaker-phones have become more popular, manufacturers have moved toward designs in which the acoustic path from the loudspeaker to the microphone is not blocked by the user's head or body. As a result, the need for more sophisticated echo suppression techniques has become paramount in modem systems.

The need is particularly pronounced in the case of hands-free automobile telephones, where the closed vehicular environment can cause multiple reflections of a loudspeaker signal to be coupled back to a high-gain hands-free microphone. Movement of the user in the vehicle and changes in the relative directions and strengths of the echo signals, for example as windows are opened and closed or as the user moves his head while driving, further complicate the task of echo suppression in the automobile environment. Additionally, more recently developed digital telephones process speech signals through voice encoders which introduce significant signal delays and create non-linear signal distortions. Such prolonged delays tend to magnify the problem of signal echo from a user perspective, and the additional non-linear distortions make echo suppression by the network equipment more difficult.

In response to the above described challenges, telephone manufacturers have developed a wide variety of echo suppression mechanisms. An exemplary echo suppression system 100 is depicted in FIG. 1A. As shown, the exemplary system 100 includes a microphone 110, a loudspeaker 120 and an echo suppressor 130. An audio output 115 of the microphone 110 is coupled to an audio input of the echo suppressor 130, and an audio output 135 of the echo suppressor 130 serves as a near-end audio input to a telephone (not shown). Additionally, a far-end audio output 125 from the telephone is coupled to an audio input of the loudspeaker 120 and to a reference input of the echo suppressor 130.

In operation, the echo suppressor 130 processes the microphone signal 115 to provide the audio output signal 135 to a far-end telephone user. More specifically, the echo suppressor 130 attenuates the microphone signal 115, in dependence upon the far-end audio signal 125, so that acoustic echo from the loudspeaker 120 to the microphone 110 is not passed back to the far-end telephone user.

Typically, the echo suppressor 130 is either a non-linear, clipping type suppressor or a linear, scaling type suppressor. Clipping type suppressors generally attenuate the microphone output signal 115 by removing a portion of the signal falling within a particular range of values (i.e., within a particular clipping window). Scaling type suppressors, on the other hand, attenuate the microphone output signal 115 by multiplying the signal with an appropriate scale factor. In either case, the degree of attenuation is generally adjusted, either directly or indirectly, in accordance with the amplitude of the far-end audio signal 125 so that the microphone output 115 is attenuated only to the extent the far-end user is speaking.

A conventional clipping type suppressor, known in the art as a center clipper, is described for example in U.S. Pat. No. 5,475,731, entitled "Echo-Canceling System and Method Using Echo Estimate to Modify Error Signal" and issued Dec. 12, 1995 to Rasmusson et al, which is incorporated herein in its entirety by reference. An alternative clipping type suppressor, known as an AC-Center clipper, is described in parent application Ser. No. 08/775,797, entitled "An AC-Center Clipper for Noise and Echo Suppression in a Communications System" and filed Dec. 31, 1996. An exemplary scaling type suppressor is described in U.S. Pat. No. 5,283,784, entitled "Echo Canceller Processing Techniques and Processing" and issued Feb. 1, 1994 to Genter, which is also incorporated herein in its entirety by reference.

The echo suppressor 130 of FIG. 1A can also be combined with a linear echo canceler to provide a more sophisticated echo suppression system. FIG. 1B depicts an exemplary system 101 including the microphone 110, the loudspeaker 120 and the echo suppressor 130 of FIG. 1A, and an acoustic echo canceler 140. As shown, the audio output 115 of the microphone 110 is coupled to an audio input of the acoustic echo canceler 140, and control and audio outputs 144, 145 of the acoustic echo canceler 140 are coupled to control and audio inputs of the echo suppressor 130, respectively. The audio output 135 of the echo suppressor 130 serves as the near-end audio input to the telephone (not shown), and the far-end audio output 125 from the telephone is coupled to the audio input of the loudspeaker 120 and to reference inputs of the acoustic echo canceler 140 and the echo suppressor 130.

In operation, the acoustic echo canceler 140 dynamically models the acoustic path from the loudspeaker 120 to the microphone 110 and attempts to cancel, from the microphone output signal 115, any loudspeaker sound that is picked up by the microphone 110. Algorithms commonly used for modeling the acoustic echo path include the well known Least Mean Squares (LMS) algorithm and variants such as Normalized Least Mean Squares (NLMS). An exemplary Least Mean Squares based canceler is described in the above referenced U.S. Pat. No. 5,475,731 to Rasmusson et al. An advanced Normalized Least Mean Squares based canceler is described in parent application Ser. No. 08/852,729, entitled "An Improved Echo Canceler for use in Communications Systems" and filed May 7, 1997.

The control output, or control metric 144 indicates, for example, the instantaneous cancelation achieved by the acoustic echo canceler 140 and is used, for example, by the echo suppressor 130 to determine the additional attenuation needed to suppress any residual echo component to a particular goal level. As in the system 100 of FIG. 1A, the echo suppressor 130 can be a clipping suppressor or a scaling suppressor. When following the echo canceler 140, the echo suppressor 130 can also be a simple switch which selectively mutes the audio output 135 at appropriate times (e.g., during periods in which a near-end voice activity detector indicates that the microphone signal 115 contains no near-end speech). The control metric 144 is thus adjusted, as is described for example in the above cited patents and patent applications, based upon the type of echo suppressor 130 being utilized. Advanced techniques for controlling echo suppressors generally are also described in copending U.S. patent application Ser. No. 09/005,144, entitled "Methods and Apparatus for Controlling Echo Suppression in Communications Systems" and filed on even date herewith, which is incorporated herein in its entirety by reference.

Note that in both of the exemplary systems 100, 101 of FIGS. 1A and 1B, the echo suppressor 130 attenuates the entire audio signal. Thus, in addition to attenuating the echo, the echo suppressor 130 also attenuates any background noise and/or near-end speech which may be present. In fact, the background noise can be suppressed to the point that the far-end user may erroneously believe that the call has been disconnected when the echo suppressor 130 is active. Therefore, to improve the quality of communication for the far-end user, today's systems often add comfort noise to the telephone audio signal 135 when the echo suppressor 130 is active. Advanced methods for generating and utilizing comfort noise are described, for example, in copending U.S. patent application Ser. No. 09/005,145, entitled "Methods and Apparatus for Providing Comfort Noise in Communications Systems" and filed on even date herewith, which is incorporated herein in its entirety by reference.

While the above described systems provide sophisticated echo suppression, they also suffer from several significant drawbacks. For example, known clipping and scaling echo suppressors can introduce bothersome artifacts into the near-end telephone signal. Additionally, known methods for controlling echo suppressors (i.e., for providing suitable control metrics) can result in undue near-end signal distortion and/or inadequate echo suppression under certain conditions. Consequently, there is a need for improved methods and apparatus for providing echo suppression and echo suppression control.

SUMMARY OF THE INVENTION

The present invention fulfills the above-described and other needs by providing an improved echo suppressor, referred to herein as an AC-center attenuator, which attenuates the echo component of a communications signal by multiplying a portion of the communications signal by an appropriate scale factor. Specifically, the AC-center attenuator scales that portion of the communications signal lying within a sliding attenuation window. Advantageously, the attenuation window tracks a value (e.g., the signed amplitude) of the communications signal so that the AC-center attenuator can suppress the echo component while passing other signal components of interest (e.g., near-end speech and noise). The scale factor within the attenuation window and the size of the attenuation window itself can be dynamically adjusted so that the AC-center attenuator introduces minimum signal distortion and few audible artifacts.

Since the AC-center attenuator includes both scaling and clipping aspects, it can properly be considered a hybrid form of echo suppressor. In other words, the AC-center attenuator behaves like a scaling suppressor with respect to that portion of the communications signal lying within the attenuation window (i.e., it multiplies that portion of the signal by an attenuation factor) and like a clipping suppressor with respect to that portion of the communications signal lying outside the attenuation window (i.e., it passes that portion of the signal through). As a result, the AC-center attenuator provides superior echo suppression with a minimum of signal distortion.

In addition to the AC-center attenuator, the present invention also provides improved methods and apparatus for controlling echo suppressors generally. For example, the present invention provides techniques for dynamically measuring a loop echo gain which can be used to properly adjust the attenuation provided by any type of echo suppressor. Advantageously, the measured loop echo gain indicates the degree to which an echo-causing signal is being attenuated by the various aspects of a bi-directional communications system (e.g., by volume adjustment and/or by natural fading across an acoustic path from a loudspeaker to a microphone) and thus indicates the additional echo suppression needed to reduce the echo-causing signal to a particular goal level. As a result, the measured loop gain can be used to adjust the attenuation provided by a scaling, clipping or hybrid suppressor.

Advantageously, the measured loop echo gain can include the echo suppression being provided by a front-end linear echo canceler. Accordingly, the present invention provides a variety of techniques for dynamically measuring the suppression achieved by a linear echo canceler. For example, a comparison of signal energies at the input and output of any echo canceler can be used to provide an appropriate indication of dynamic echo cancelation. Additionally, for blockwise-updating echo cancelers, a comparison of update energy to canceler input energy can be used to provide an appropriate dynamic indicator. In each case, the present invention provides practical techniques for obtaining and utilizing the measurements.

In a first exemplary embodiment, an echo suppression device according to the invention includes an echo suppressor configured to process a first communications signal in order to suppress an echo component resulting from a reflection of a second communications signal. According to the embodiment, the echo suppressor scales a first portion of the first communications signal and passes a second portion of the first communications signal to provide an echo-suppressed output signal. The first portion of the first communications signal is selected using an attenuation window of the echo suppressor, and the center of the attenuation window is adjusted based on a value of the first communications signal. For example, the center of the attenuation window can be adjusted in accordance with a signed amplitude of the first communications signal. Additionally, the center of the attenuation window can be adjusted recursively such that, at each instant in time, the center is set equal to a previously computed value of the echo-suppressed output signal.

Advantageously, the echo suppressor can scale the first portion of the first communications signal using an adjustable attenuation factor, and the attenuation factor can be adjusted so that the echo suppression device provides echo attenuation based on the performance of other devices in a communications system in which the echo suppression device is implemented. For example, the attenuation factor can be adjusted based on a volume control signal which is used to adjust a volume of an audio output of the communications system. Additionally, the size of the attenuation window can be adjusted based on the second communications signal and/or on echo attenuation provided by other devices within the communications system.

According to an alternative embodiment, an echo suppression device according to the invention includes an echo suppressor configured to process an echo-containing input signal and an echo-causing reference signal in order to provide an echo-suppressed output signal. The echo suppression device also includes a gain control processor configured to estimate an echo gain of the echo suppressor. The estimate is computed based on a ratio of first and second measurements, wherein the first measurement indicates energy in the echo-suppressed output signal, and the second measurement indicates energy in the echo-containing input signal or the echo-causing reference signal.

For example, the first measurement can be derived as a square root of a sum of squares of samples of the echo-suppressed output signal, and the second measurement can be derived as a square root of a sum of squares of samples of either the echo-containing input signal or the echo-causing reference signal. Alternately, the first measurement can be derived as a root-mean-square value of samples of the echo-suppressed output signal, and the second measurement can be derived as a root-mean-square value of samples of either the echo-containing input signal or the echo-causing reference signal. Further, the estimate can be computed as a square root of the ratio of first and second measurements, where the first measurement is derived as a sum of squares of samples of the echo-suppressed output signal, and the second measurement is derived as a sum of squares of samples of either the echo-containing input signal or the echo-causing reference signal.

According to another exemplary embodiment, an echo suppression device according to the invention includes a front-end echo suppressor, a residual echo suppressor and a gain control processor. The front-end echo suppressor is configured to process an echo-containing signal and an echo-causing signal in order to provide an intermediate signal, and the residual echo suppressor is configured to selectively attenuate the intermediate signal to provide an echo-suppressed output signal. The gain control processor is configured to estimate an echo gain of the front-end echo suppressor based on a ratio of first and second measurements, and the echo gain estimate is used to adjust echo attenuation provided by the residual echo suppressor.

An alternative echo suppression device according to the invention includes an echo canceler, including one or more adaptive filter coefficients, configured to process an echo-containing input signal and an echo-causing reference signal in order to provide an echo-canceled output signal. The echo suppression device also includes a gain control processor configured to estimate an echo gain of the echo canceler based on a ratio of first and second measurements, wherein the first measurement indicates a change in at least one of the adaptive filter coefficients of the echo canceler during a time interval, and wherein the second measurement is based on either the echo-containing input signal or the echo-causing reference signal during the time interval.

For example, the first measurement can be derived as a peak of measured changes in the filter coefficients during the time interval, or as a square root of a sum of squares of measured changes in the filter coefficients during the time interval. Additionally, the second measurement can be derived as a square root of a sum of squares of samples of either the echo-containing input signal or the echo causing reference signal, or as a root-mean-square value of samples of either the echo-containing input signal or the echo causing reference signal.

In an additional exemplary embodiment, an echo suppression device according to the invention includes an echo canceler, a residual echo suppressor and a gain control processor. The echo canceler includes one or more adaptive filter coefficients and is configured to process an echo-containing signal and an echo-causing signal in order to provide an echo-canceled signal. The residual echo suppressor is configured to selectively attenuate the echo-canceled signal to provide an echo-suppressed signal, and the gain control processor is configured to estimate an echo gain of the echo canceler based on a ratio of first and second measurements. The first measurement indicates a change in at least one of the adaptive filter coefficients during a time interval, and the echo gain estimate is used to adjust echo attenuation provided by the residual echo suppressor.

The first measurement can be derived, for example, as a peak of measured changes in the filter coefficients during a time interval, or as a square root of a sum of squares of measured changes in the filter coefficients during the time interval. Additionally, the second measurement can be derived, for example, as a square root of a sum of squares of samples of either the echo-containing input signal or the echo causing reference signal, or as a root-mean-square value of samples of either the echo-containing input signal or the echo causing reference signal. Further, the ratio can be computed as a square root of the first and second measurements, wherein the first measurement is derived as a sum of squares of measured changes in the filter coefficients during a time interval, and wherein the second measurement is derived as a sum of squares of samples of either the echo-containing input signal or the echo-causing reference signal during the time interval.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

DETAILED DESCRIPTION OF THE INVENTION

As described in the Background of the Invention above, parent application Ser. No. 08/775,797 discloses an improved echo suppressor known as an AC-center clipper. By way of contrast to conventional center clippers which fully attenuate, or clip input signals falling within a fixed clipping window (typically centered around zero), the AC-center clipper provides a variable clipping window having a center which approximately tracks the envelope of the input signal. As a result, the AC-center clipper provides superior performance as compared to a conventional center clipper, particularly in situations where an echo component of an input signal is superimposed on desired speech or noise components of the input signal.

Recent empirical studies have shown, however, that the AC-center clipper can still introduce bothersome distortion when echo is clipped during periods of speech and/or noise. The present invention teaches that such distortion results from the discontinuity in signal gain which is introduced by the AC-center clipper. In other words, the distortion results from the fact that input signals falling within the adjustable window of the AC-center clipper are completely clipped, while input signals falling outside the adjustable window are not attenuated at all.

Figure 2:
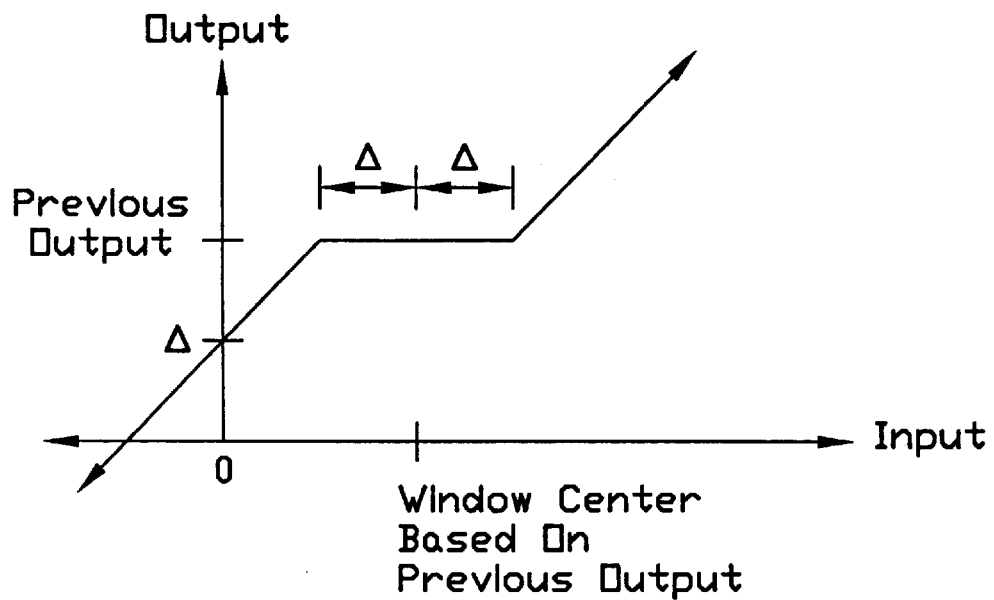
FIG. 2 depicts operation of an improved echo suppressor, referred to herein as an AC-center clipper, according to the present invention.

This aspect of the AC-center clipper is perhaps best understood with reference to FIG. 2, wherein output of the AC-center clipper at a particular moment time is depicted as a function of the AC-center clipper input. As described in parent application Ser. No. 08/775,797, the AC-center clipper includes an adjustable clipping window defined by an adjustable clipping threshold $\Delta$ and an adjustable window center which is set based on the most recent output of the AC-center clipper. Then, for a prevailing clipping window, any portion of the input signal falling within the window is clipped, while any portion of the input signal falling outside the window is allowed to pass through unattenuated as shown in FIG. 2. As a result, the AC-center clipper can distort speech and noise signals as described above.

To remedy this problem, the present invention provides an alternative improved echo suppressor, referred to herein as an AC-center attenuator. Like the AC-center clipper, the AC-center attenuator includes a sliding window which is defined by an adjustable threshold $\Delta$ and which moves to approximately track the envelope of the input signal. However, unlike the AC-center clipper, the AC-center attenuator does not completely remove that portion of the input signal falling within the sliding window. Rather, the AC-center attenuator scales that portion of the input signal using an appropriate attenuation factor $\alpha$.

As a result, the discontinuity in signal gain at the boundaries of the attenuation window can be made less severe, and the AC-center attenuator can be adjusted to introduce fewer audible artifacts as compared to the AC-center clipper. Further, the AC-center attenuator retains the advantages of the AC-center clipper with respect to reduced signal distortion. In other words, because the attenuation window of the AC-center attenuator moves to approximately track the envelope of the input signal, the AC-center attenuator can suppress echo while passing other signal components of interest. As described in detail below, the attenuation factor $\alpha$ and the window size $\Delta$ of the AC-center attenuator can be dynamically adjusted so that the AC-center attenuator can continually provide a proper balance between maximal echo suppression and minimal signal distortion.

Figure 3:
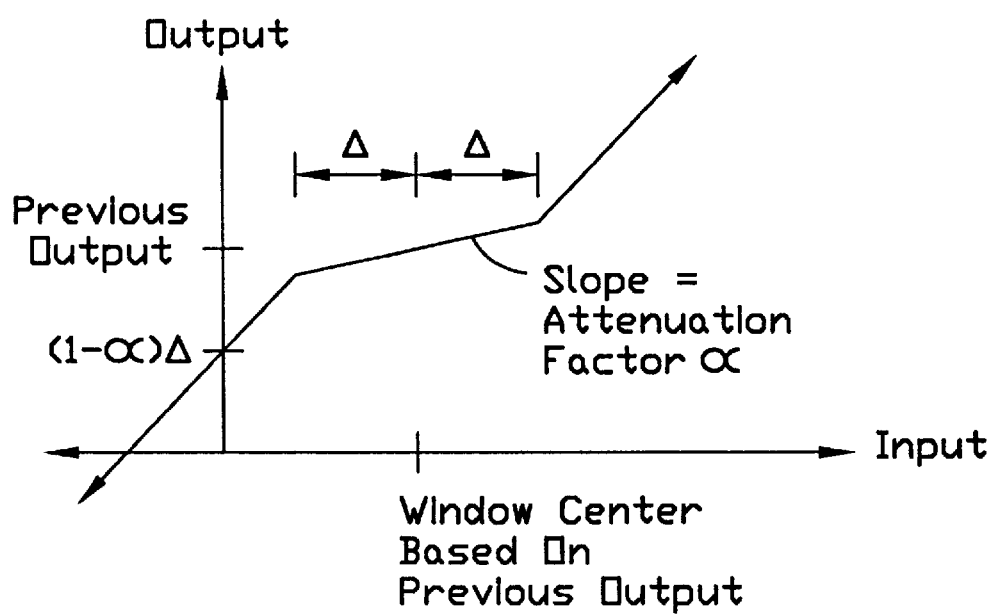
FIG. 3 depicts operation of an alternative improved echo suppressor, referred to herein as an AC-center attenuator, according to the present invention.

The above described operation of the AC-center attenuator is depicted in FIG. 3, wherein output of the AC-center attenuator at a particular moment in time is depicted as a function of the AC-center attenuator input. Note from FIGS. 2 and 3 that the AC-center clipper is actually a special case of the AC-center attenuator. In other words, the AC-center clipper is actually an AC-center attenuator in which the attenuation factor $\alpha$ is set to zero. Also note from FIG. 3 that the AC-center attenuator can be put in a pass-through mode (i.e., a mode in which the output is always equal to the input) by setting the attenuation factor $\alpha$ to unity and/or by setting the window size $\Delta$ to zero.

The AC-center attenuator can be implemented, for example, using the following pseudo-code:

```
% If the input signal is below the window,
if Input <= (LastOutput − Delta),
    % Use all of signal outside window and attenuate signal within window.
    Output = Input + Delta − ScaleFactor * Delta;
% Else if the input signal is above the window,
elseif Input >= (LastOutput + Delta),
    % Use all of signal outside window and attenuate signal within window.
    Output = Input − Delta + ScaleFactor * Delta;
% Else the input is inside the window.
else,
    % So attenuate the signal.
    Output = ScaleFactor * (Input − LastOutput) + LastOutput;
end
% Save output for next cycle
LastOutput = Output
```

In FIG. 3 and in the pseudo-code above, the center of the AC-center attenuator window is made to closely track the envelope of the input signal by dynamically shifting the center of the attenuation window to continually match the AC-center attenuator output. However, the AC-center attenuator window can also be made to more loosely track the envelope of the input signal. For example, the window center can be shifted to match the AC-center attenuator output when the input signal falls outside the prevailing window and left alone, or made to decay toward zero, otherwise. Alternatively, the window center can be limited so that the boundaries of the window never exceed the full-scale range of the input signal (e.g., when the window size spans the full-scale range of the input signal, the window center is forced to zero). Doing either or both of these things prevents the AC-center attenuator from introducing unnecessary signal distortion (due to continual shifting of the attenuation window) when the input signal consists primarily of echo (and there is no need to track the input envelope in an attempt to pass other signal components).

Advantageously, the AC-center attenuator can be used as a stand alone echo suppressor in a system such as that described above with respect to FIG. 1A. Accordingly, FIG.

Figure 1A:
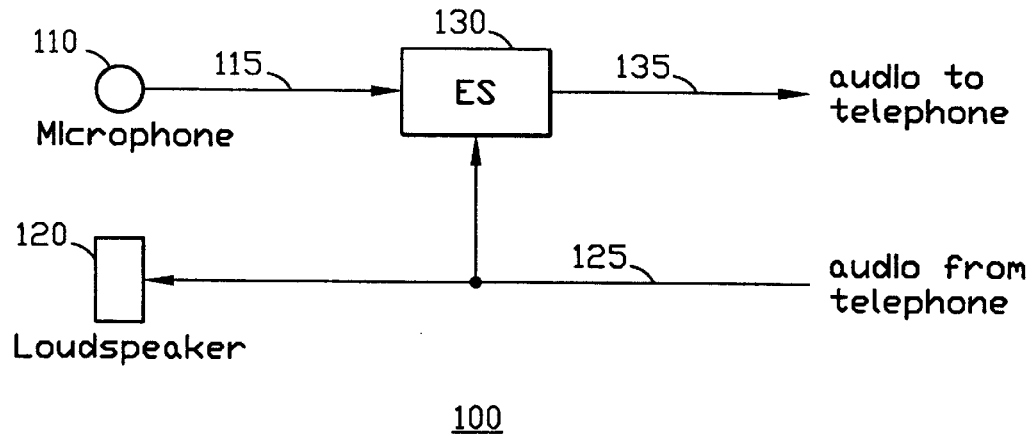
FIG. 1A depicts an exemplary echo suppression system in which the teachings of the present invention can be implemented.

4 depicts an exemplary system 400 in which the echo suppressor 130 of FIG. 1A is implemented as an AC-center attenuator. As shown, the exemplary system 400 includes the microphone 110, the loudspeaker 120 and the AC-center attenuator 130, as well as a gain control processor 410, a multiplier 420, an envelope detector 430 and a volume gain block 440.

Figure 4:
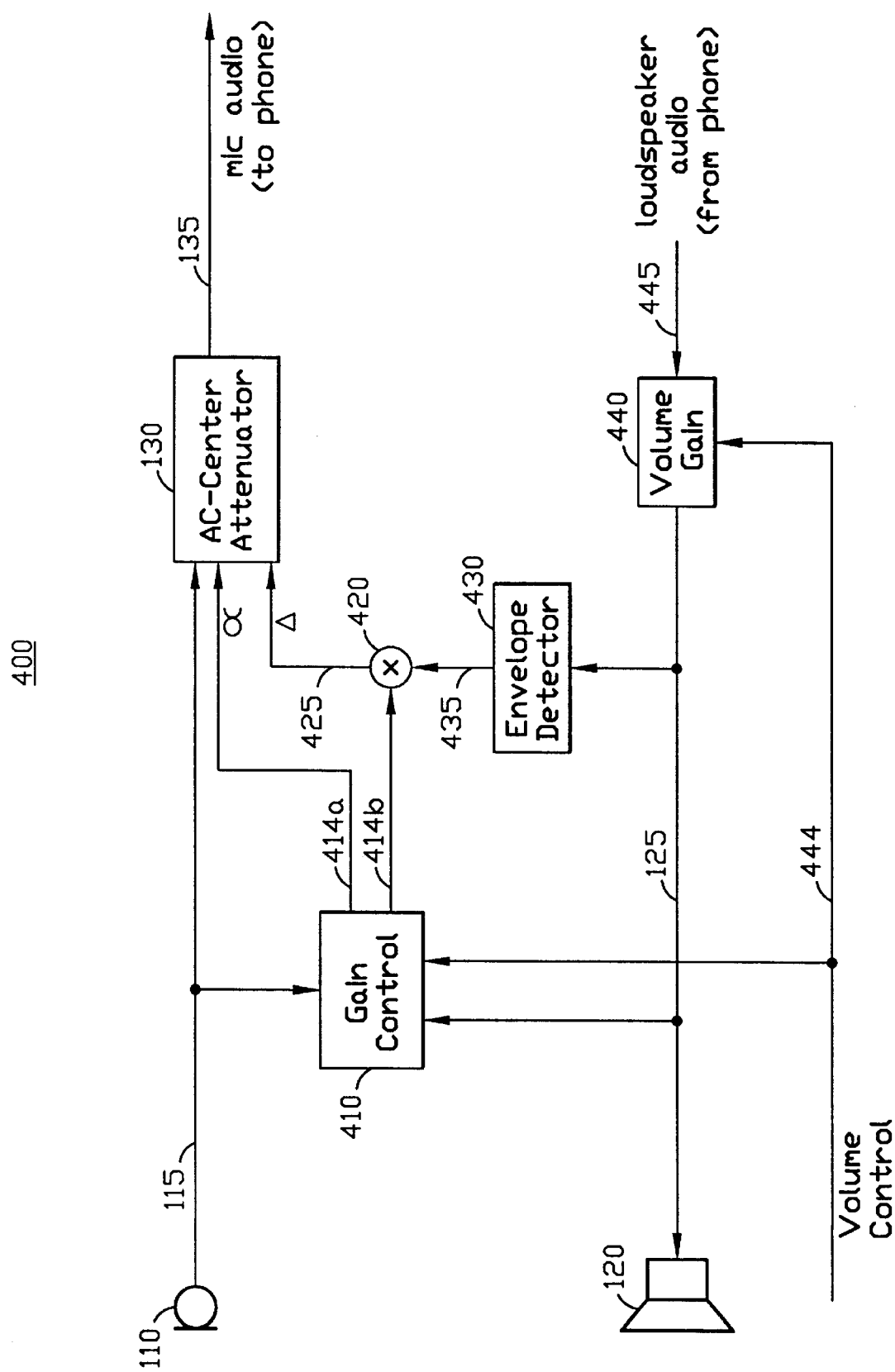
FIG. 4 depicts an exemplary echo suppression system including the AC-center attenuator of FIG. 3.

In FIG. 4, the microphone output 115 is coupled to a first reference input of the gain control processor 410 and to the audio input of the AC-center attenuator 130. The audio output 135 of the AC-center attenuator 130 serves as the audio input to the telephone (not shown), and an audio output 445 from the telephone is coupled to an audio input of the volume gain block 440. An audio output 125 of the volume gain block 440 serves as audio input to the loudspeaker 120 and is coupled to the envelope detector 430 and to a second reference input of the gain control processor 410.

A volume control signal 444 is coupled to a control input of the volume gain block 440 and to a third reference input of the gain control processor 410. A first control output 414a of the gain control processor 410 is coupled to a first control input of the AC-center attenuator 130, and a second control output 414b of the gain control processor 410 is coupled to a first input of the multiplier 420. A reference output 435 of the envelope detector 430 is coupled to a second input of the multiplier 420, and an output 425 of the multiplier 420 is coupled to a second control input of the AC-center attenuator 130.

Generally, operation of the system 400 of FIG. 4 is similar to that of the system 100 of FIG. 1A. In other words, the AC-center attenuator 130 processes the microphone signal 115, in dependence upon the loudspeaker signal 125, so that acoustic echo from the loudspeaker 120 to the microphone 110 is not passed back to the far-end telephone user. In the system 400 of FIG. 4, however, the gain control processor 410 adjusts the attenuation provided by the AC-center attenuator 130 via the control signals 414a, 414b.

The volume gain block 440 is included in the system 400 of FIG. 4 to better illustrate operation of the gain control processor 410. Generally, the volume gain block 440 attenuates the telephone audio signal 445, in accordance with the volume control signal 444, and passes the attenuated audio signal 125 to the loudspeaker 120. The volume control signal 444 can be adjusted, for example, by the near-end user.

The gain control processor 410 utilizes the volume control signal 444, the microphone signal 115 and/or the loudspeaker signal 125 to adjust the attenuation provided by the AC-center attenuator 130. More specifically, the gain control processor 410 utilizes the reference signals 115, 444, 125 to dynamically estimate a loop, or round-trip, echo gain which is in turn used to compute the control signals 414a, 414b. The estimated loop gain indicates the degree to which far-end speech in the telephone audio signal 445 is being attenuated as it passes through the volume control block 440 and across the acoustic path from the loudspeaker 120 to the microphone 110. The estimated loop gain can thus be used to compute the amount of additional attenuation the AC-center attenuator 130 should provide.

For example, the window size Δ of the AC-center attenuator 130 can be set just large enough to capture the estimated echo component of the input audio signal 115 (but no larger than necessary, since increases in window size result in increased signal distortion), and the attenuation factor α of the AC-center attenuator can be set such that any residual echo component in the output audio signal 135 is attenuated to a particular goal level. Advanced methods for setting the window size Δ and the attenuation factor α based on an estimated loop gain are described for example in the above referenced copending patent application Ser. No. 09/005,144, entitled "Methods and Apparatus for Controlling Echo Suppression in Communications Systems" and filed on even date herewith. A particular exemplary technique is also described by way of pseudo-code below.

To estimate the overall loop echo gain, the control processor 410 computes the echo attenuation provided by the volume gain block 440 and by the acoustic path from the loudspeaker 120 to the microphone 110. The attenuation provided by the volume gain block 440 is inherent in the volume control signal 444. However, the attenuation provided by the acoustic path (which is referred to as the channel gain) is estimated based on the microphone and loudspeaker signals 115, 125. Advanced methods for estimating the channel gain are described by way of pseudo-code below. Note also that, instead of dynamically estimating the channel gain during operation, a fixed worst-case channel gain estimate can be set a priori based on the environment in which the system 400 is intended to operate.

As shown in FIG. 4, the gain control processor 410 computes an appropriate attenuation factor α which is passed directly to the AC-center attenuator 130 via the first control signal 414a. The gain control processor 410 also computes an appropriate window size (e.g., a window size just large enough to capture the estimated echo component of the audio signal 115) which is conveyed by the second control signal 414b. The second control signal 414b is not used directly as the window size Δ of the AC-center attenuator 130 however. Rather, the second control signal 414b is multiplied by the output 435 of the envelope detector 430, and the output 425 of the envelope detector 430 is used as the window size Δ for the AC-center attenuator 130. Multiplying the estimated window size by the detector output 435 ensures that the AC-center attenuator 130 is active only when necessary.

For example, when the far-end user is silent, the amplitude of the loudspeaker signal 125 and the output 435 of the envelope detector 430 are approximately zero. Thus, the output 425 of the multiplier 420 is zero and the AC-center attenuator 130 acts as a pass-through, having no effect on the near-end signal 115. Alternatively, when the far-end user is speaking, the loudspeaker signal 125 and the output 435 of the envelope detector 430 are non-zero. Therefore, the output 425 of the multiplier 420 is non-zero, and the AC-center attenuator 130 operates as described above.

Since the AC-center attenuator 130 is active only when the far-end user is speaking, it does not distort near-end voice and noise in near-end single-talk situations. During far-end single talk and double-talk situations, however, the AC-center attenuator 130 is active and does distort near-end voice and/or noise in addition to suppressing echo. Nonetheless, since the distortion introduced by the AC-center attenuator 130 is slight as compared to that introduced by conventional suppressors, the AC-center attenuator 130 never need be completely deactivated, even during periods of double-talk. As a result, the AC-center attenuator 130 can serve as an effective full-time echo suppressor, even without a front-end echo canceler.

The envelope detector 430 of FIG. 4 can be constructed, for example, as an exponential-decay peak detector. In such case, a time constant of the detector 430 is set so that the decay rate of the detector output 435 is no faster than the decay rate associated with the acoustic path between the loudspeaker 120 and the microphone 110. In other words, a peak in the detector output 435 (induced by a peak in the loudspeaker signal 125) should fall off no faster than the corresponding echo signal (including reverberations) picked up at the microphone 110. The decay rate of the detector 430 should not be made so slow, however, that near-end transmissions are significantly distorted. Note also that any DC offset which may be present in the loudspeaker signal 125, or which may be introduced during analog-to-digital conversion of the loudspeaker signal 125, can be removed from the input to the envelope detector 430 (e.g., by AC-coupling or high-pass filtering) so that the window size Δ of the AC-center attenuator 130 is not made artificially and unnecessarily high.

Figure 1B:
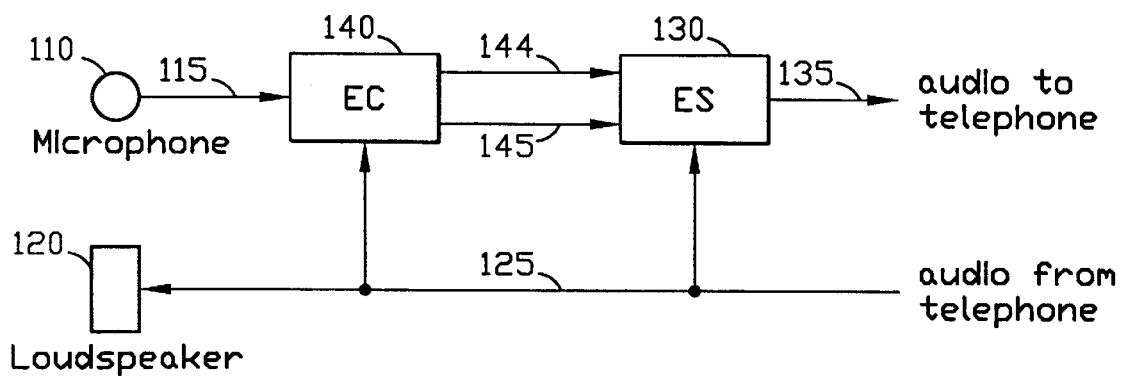
FIG. 1B depicts an alternative exemplary echo suppression system in which the teachings of the present invention can be implemented.
Figure 5:
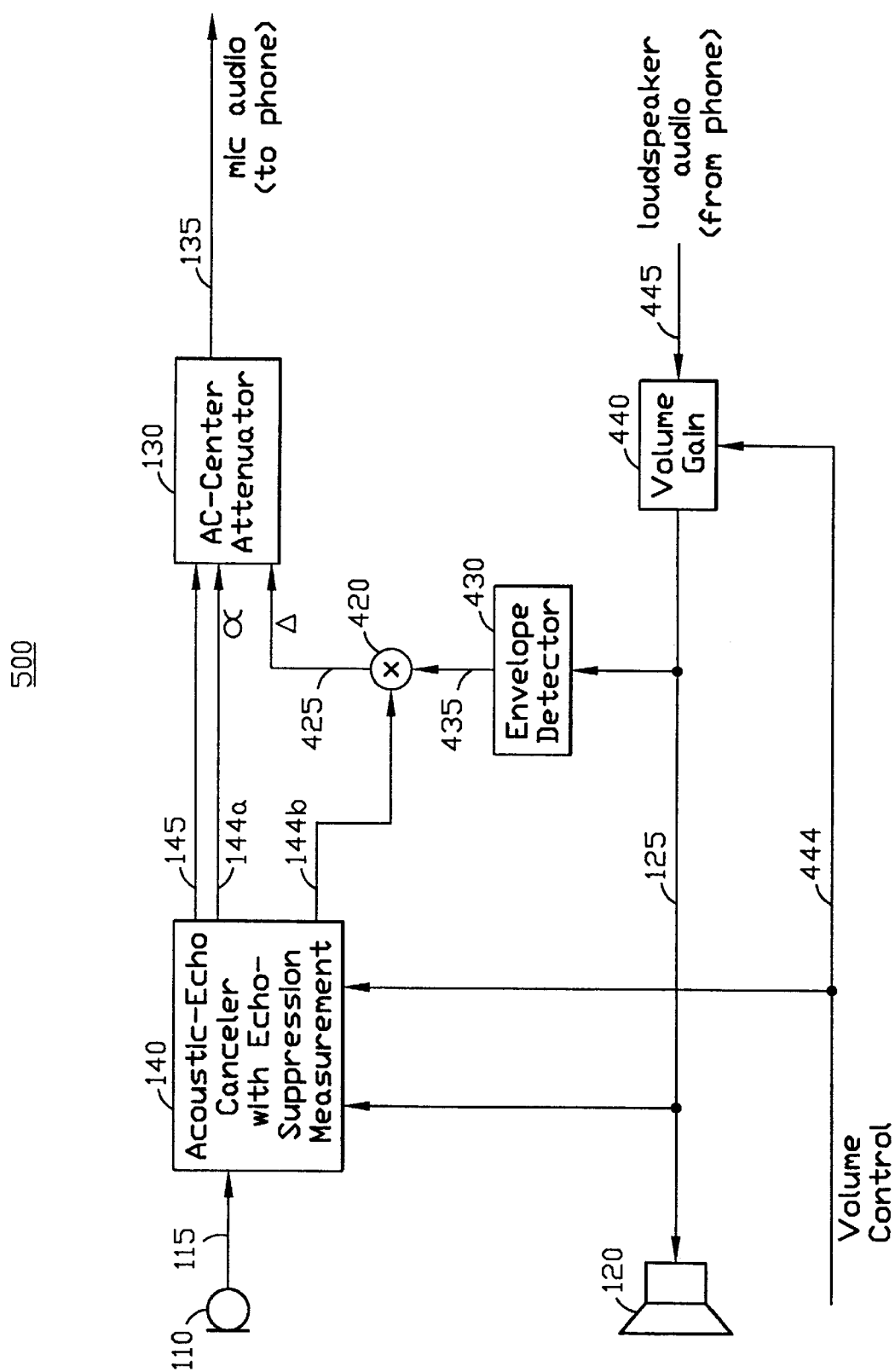
FIG. 5 depicts an alternative exemplary echo suppression system including the AC-center attenuator of FIG. 3.

Advantageously, the AC-center attenuator of the present invention can also be combined with a front-end echo canceler such as that described above with respect to FIG. 1B. Accordingly, FIG. 5 depicts an exemplary system 500 in which the echo suppressor 130 of FIG. 1B is implemented as an AC-center attenuator. As shown, the exemplary system 500 includes the microphone 110, the loudspeaker 120, the AC-center attenuator 130, the echo canceler 140, the multiplier 420, the envelope detector 430 and the volume gain block 440.

In FIG. 5, the microphone output 115 is coupled to the audio input of the echo canceler 140, and the audio output 145 of the echo canceler 140 is coupled to the audio input of the AC-center attenuator 130. The audio output 135 of the AC-center attenuator 130 serves as the audio input to the telephone (not shown), and the audio output 445 from the telephone is coupled to the audio input of the volume gain block 440. The audio output 125 of the volume gain block 440 is coupled to the audio input of the loudspeaker 120, the reference input of the envelope detector 430 and a first reference input of the echo canceler 140.

The volume control signal 444 is coupled to the control input of the volume gain block 440 and to a second reference input of the echo canceler 140. A first control output 144a of the echo canceler 140 is coupled to the first control input of the AC-center attenuator 130, and a second control output 144b of the echo canceler 140 is coupled to the first input of the multiplier 420. The reference output 435 of the envelope detector 430 is coupled to the second input of the multiplier 420, and the output 425 of the second multiplier 420 is coupled to the second control input of the AC-center attenuator 130.

Generally, operation of the system 500 of FIG. 5 is similar to that of the system 101 of FIG. 1B. In other words, the acoustic echo canceler 140 dynamically models the acoustic path from the loudspeaker 120 to the microphone 110 and attempts to cancel any loudspeaker sound picked up by the microphone 110. The AC-center attenuator 130 then provides additional echo attenuation as necessary, and comfort noise is optionally added to the output signal 135 to compensate for near-end noise attenuated by the AC-center attenuator 130. In the system 500 of FIG. 5, however, the echo canceler 140 includes gain control processing analogous to that provided by the gain control processor 410 of FIG. 4.

Specifically, the echo canceler 140 of FIG. 5 estimates a loop echo gain from the far-end input 445, through the volume gain block 440, across the acoustic path from the loudspeaker 120 to the microphone 110 and through the echo canceler 140 itself. The loop echo gain is estimated based on the microphone, loudspeaker and canceler output signals 115, 125, 145, and the loop echo gain is used to compute the first and second control signals 144a, 144b for the. AC-center attenuator 130. Like the first control signal 414a of FIG. 4, the first control signal 144a of FIG. 5 is used directly as the attenuation factor α for the AC-center attenuator 130, and like the second control signal 414b of FIG. 4, the second control signal 144b of FIG. 5 is multiplied by the output of the envelope detector 430 to provide the window size Δ for the AC-center attenuator 130.

To estimate the loop echo gain, the echo canceler 140 of FIG. 5 computes the attenuation provided by the volume gain block 440, the acoustic path and the echo canceler 140 itself. As in the system 400 of FIG. 4, the attenuation provided by the volume gain block 440 is inherent in the volume control signal 444, and the attenuation provided by the acoustic path is either dynamically estimated based on the microphone and loudspeaker signals 115, 125 or set to a fixed worst-case value. Advantageously, the attenuation provided by the echo canceler 140 can be computed in accordance with any one of multiple techniques provided by the present invention.

In a first exemplary embodiment, the echo canceler 140 estimates the instantaneous echo attenuation it is providing based on the microphone signal 115 and the canceler output signal 145. More specifically, the echo canceler 140 computes the attenuation estimate as a ratio of first and second values, wherein the first and second values provide an indication of energy in the canceler output and input signals 145, 115, respectively.

For example, the first value (i.e., the numerator of the ratio) can be computed as the square root of an accumulation of squared magnitudes, each squared magnitude corresponding to a sample of the canceler output signal 145. In such case, the second value (i.e., the denominator of the ratio) is computed similarly as the square root of an accumulation of squared samples of the canceler input signal 115. Alternately, the numerator and denominator of the ratio can be computed as root-mean-square (RMS) values of the canceler output and input signals 115, respectively.

Advantageously, such a ratio provides an accurate indication of the cancelation being achieved by the echo canceler 140 during periods of far-end single talk. In other words, when only the far-end user is speaking, the energy in the microphone and canceler output signals 115, 145 results primarily from echo (though background noise will contribute as well), and a ratio based on the relative energies provides a direct indication of how much echo is being removed by the echo canceler 140.

Those skilled in the art will appreciate that methods for detecting periods of far-end single talk (i.e., to ensure that the ratio of energies is computed only when it is appropriate to do so) are well known. Additionally, advanced methods for detecting far-end single talk are described below by way of exemplary pseudo-code. Since specific details of far-end single talk detection are not critical to an understanding of the present invention, however, such details are omitted here.

Advantageously, the denominator of the ratio can also be computed (as described above) based on the loudspeaker signal 125 instead of the microphone signal 115. In such case, the ratio provides an indication of the instantaneous echo attenuation from the input of the loudspeaker 120, across the acoustic path from the loudspeaker 120 to the microphone 110 and through the echo canceler 140 (i.e., the ratio encompasses both the channel gain and the canceler gain).

In any case, estimates of the noise in the microphone, loudspeaker and/or canceler output signals 115, 125, 140 can be subtracted from those signals before computations are performed in order to improve accuracy of the resulting ratio. Those skilled in the art will appreciate that methods for estimating the noise level in an audio signal are known. Additionally, advanced methods for obtaining noise level estimates are described below by way of exemplary pseudo-code. Again, however, since specific details relating to noise level estimation are not critical to an understanding of the presently claimed invention, such details are omitted here.

Note that the above described ratio provides a valuable indication of echo cancelation no matter what type of echo canceler 140 is utilized. In other words, the ratio of input and output energies reflects the degree of echo cancelation (during far-end single talk) irrespective of the precise way in which the echo canceler 140 processes the audio signal 115 to suppress echo. Thus, the above described technique for estimating the echo attenuation provided by an echo canceler is applicable to literally any type of echo canceler. Indeed, the technique is generally applicable to linear and non-linear echo suppressors of any kind, including the clipping, scaling and hybrid suppressors described above.

Advantageously, the present invention also provides more specialized techniques for estimating the echo suppression provided by particular types of echo cancelers. For example, the present invention provides techniques for estimating the echo suppression provided by blockwise-updating echo cancelers (i.e., echo cancelers in which the coefficients of an adaptive filter are updated in a blockwise fashion). An exemplary blockwise-updating echo canceler is described in copending U.S. patent application Ser. No. 08/578,944, entitled "Gauging Convergence of Adaptive Filters" and filed Dec. 27, 1995, which is incorporated herein in its entirety by reference. Additionally, an advanced blockwise-updating echo canceler is described in parent application Ser. No. 08/852,729.

Figure 6:
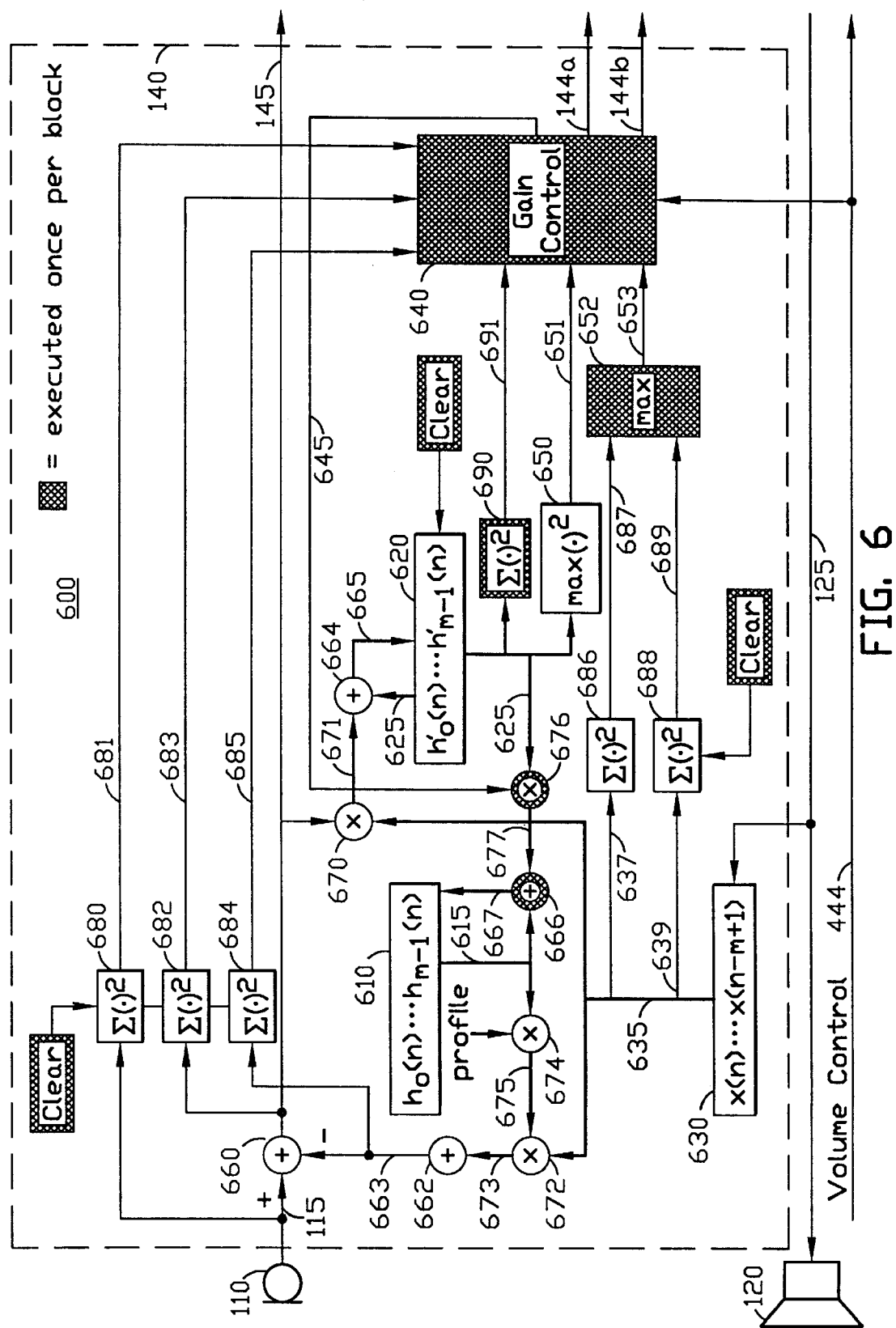
FIG. 6 depicts an exemplary echo canceler which can be used to implement the echo suppression system of FIG. 5.

To illuminate the techniques of the present invention, a modified version of the blockwise-updating echo canceler of parent application Ser. No. 08/852,729 is depicted in FIG. 6. As shown, the exemplary canceler 140 of FIG. 6 includes a coefficient register 610, an update register 620, a sample register 630, a gain control processor 640, a max-squares block 650, a max block 652, first through fourth summing devices 660, 662, 664, 666, first through fourth multipliers 670, 672, 674, 676, and first through sixth sum-of-squares accumulators 680, 682, 684, 686, 688, 690.

In FIG. 6, the microphone output 115 is coupled to an input of the first sum-of-squares accumulator 680 and to an additive input of the first summing device 660. An output 145 of the first summing device 660 serves as the audio output for the echo canceler 140 and is coupled to an input of the second sum-of-squares accumulator 682 and to a scaler input of the first multiplier 670. Outputs 681, 683, 685 of the first, second and third sum-of-squares accumulators 680, 682, 684 are coupled to first, second and third reference inputs of the gain control processor 640, respectively. A first control output 645 of the gain control processor 640 is coupled to a scaler input of the fourth multiplier 676, and second and third control outputs 144a, 144b of the gain control processor 640 serve as the first and second control outputs of the echo canceler 140.

The audio output 125 from the volume gain block 440 is coupled to a queue input of the sample register 630 and to the audio input of the loudspeaker 120, and the volume control signal 444 is coupled to a fourth reference input of the gain control processor 640. A vector output 635 of the sample register 630 is coupled to vector inputs of the first and second multipliers 670, 672. First and second taps 637, 639 of the sample register output 635 are coupled to inputs of the fourth and fifth sum-of-squares accumulators 686, 688, respectively. Outputs 687, 689 of the fourth and fifth sum-of-squares accumulators 686, 688 are coupled to first and second inputs of the max block 652, respectively, and an output 653 of the max block 652 is coupled to a fifth reference input of the gain control processor 640.

A vector output 671 of the first multiplier 670 is coupled to a first vector input of the third summing device 664, and a vector output 665 of the first summing device 664 is coupled to a vector input of the update register 620. A vector output 625 of the update register 620 is coupled to a second vector input of the third summing device 664 and to vector inputs of the fourth multiplier 676, the sixth sum-of-squares accumulator 690 and the max-squares block 650. Outputs 691, 651 of the sixth sum-of-squares accumulator 690 and the max-squares block 650 are coupled to sixth and seventh reference inputs of the gain control processor 640, respectively.

A vector output 677 of the fourth multiplier 676 is coupled to a vector input of the fourth summing device 666, and a vector output 667 of the fourth summing device 666 is coupled to a vector input of the coefficient register 610. A vector output 615 of the coefficient register 610 is coupled to a vector input of the fourth summing device 666 and to a vector input of the third multiplier 674. A profile vector is coupled to a second vector input of the third multiplier 674, and a vector output 675 of the third multiplier 674 is coupled to a second vector input of the second multiplier 672. A vector output 673 of the second multiplier 672 is coupled to a vector input of the second summing device 662, and a scaler output 663 of the second summing device 662 is coupled to a subtractive input of the first summing device 660 and to an input of the third sum-of-squares accumulator 684.

Detailed operation of the echo canceler 140 of FIG. 6 is described for example in parent application Ser. No. 08/852, 729. Generally speaking, the echo canceler 140 operates as an adaptive filter in which the canceler output signal 145, or error signal, is minimized according to a Least-Mean-Squares (LMS) or Normalized LMS (NLMS) algorithm and in which the transfer function of the adaptive filter (defined by a set of filter coefficients in the coefficient register 610) thus converges toward that of the echo path between the loudspeaker 120 and the microphone 110. As shown, the contents of the sample register 630 and the coefficient register 610 are convolved to provide an estimate 663 of the echo component of the microphone signal 115, and the echo estimate 663 is subtracted from the microphone signal 115 to provide the canceler output signal 145. A set of update coefficients (stored in the update register 620) are modified on a sample-wise basis in dependence upon the canceler output signal 145 and the contents of the sample register 630, and the update coefficients are used to adapt the coefficients in the coefficient register 610 in a block-wise manner (e.g., once per 160 audio samples in a TDMA telephone application). The gain control processor 640 selectively utilizes the reference signals 444, 651, 653, 681, 683, 685, 691 to compute the variable update gain 645 and to thus control the rate at which the coefficients in the coefficient register 610 are adapted.

Advantageously, the present invention teaches that the update coefficients (i.e., the contents of the update register 620) can be used to provide an indication of the instantaneous echo suppression being achieved by the echo canceler 140. To see this, first realize that, as is described in parent application Ser. No. 08/852,729, the values of the update coefficients at the end of a block provide a crude indication of how well the echo canceler 140 is doing. For example, as the echo canceler 140 converges (i.e., as the transfer function of the adaptive filter approaches the transfer function of the acoustic path, for example upon power up or following an abrupt change in the acoustic path), the values of the update coefficients at the end of each block diminish. In other words, as the adaptive filter of the echo canceler 140 begins to match the true acoustic echo path, the filter coefficients in the coefficient register 610 stabilize.

Thus, according to embodiments of the present invention, a measurement of the instantaneous echo attenuation or gain provided by the echo canceler 140 is obtained by normalizing one or more of the update coefficients at the end of each block. More specifically, the attenuation estimate is computed at the end of each block as a ratio of first and second values, wherein the first value is based on one or more of the update coefficients and the second value provides an indication of energy in the canceler input signal 115.

For example, the first value (i.e., the numerator of the ratio) can be computed as the square root of an accumulation of squared update coefficients at the end of each block (e.g., as the square root of the output of the sum-of-squares accumulator 691). Alternately, the numerator of the ratio can be set equal to the peak update coefficient at the end of each block (e.g., set equal to the square root of the output of the max-squares device 651). In either case, the denominator of the ratio can be computed, as described above, as the square root of an accumulation of squared samples of the canceler input signal 115.

Advantageously, such a ratio provides a measurement of echo attenuation provided by the echo canceler 140 and can be used in computing the system loop gain as described above. Alternatively, the denominator of the ratio can be computed based on the loudspeaker signal 125 to obtain an indication of echo attenuation provided by a combination of the acoustic path and the echo canceler 140 (i.e., a combination of the channel gain and the canceler gain). Although this embodiment of the present invention is described with respect to the particular blockwise-updating echo canceler described in parent application Ser. No. 08/852,729, the embodiment is equally applicable to any echo canceler in which update coefficients are retained.

By way of example, aspects of the present invention are described in further detail in the pseudo-code provided below. The pseudo-code is written to simulate an exemplary echo suppression system as implemented using a 32-bit digital signal processor. Those skilled in the art will appreciate that such code is exemplary in nature and that equivalents can be implemented using a wide variety of hardware configurations. The exemplary echo suppression system includes a modified version of the improved echo canceler described in parent application Ser. No. 08/852,729 in combination with the AC-center attenuator described above.

```
% AEC and ANLP simulation script for MATLAB.
% Before running this script, set the following variables:
%    inFile = name of input file, left = far end, right = near end.
%   outFile = name of output file, left = ANLP output, right = AEC output.
% All files use the raw format of the DAT-Link.
% estnoise.m contains the function to estimate noise.
% Glossary:
% EC = Echo Canceler = linear echo suppresser
% AEC = Acoustic-Echo Canceler = loudspeaker-echo canceler
% NLP = Non-Linear Process = residual-echo suppresser = AC-center attenuator
% ANLP = Acoustic Non-Linear Process
% VAD = Voice-Activity Detector
% Maximum positive value for fractional representation.
ONE = 32767/32768;
% Read file containing far-end and near-end signals.
fidIn = fopen(inFile, 'r');
if fidIn == -1
    error(['Error opening file ' inFile])
end
[LRmatrix, wordCount] = fread(fidIn, [2,inf],'int16');
fclose(fidIn);
% The number of samples in the update integration period.
FRAME_SIZE = 160;
% Larger frame sizes give greater robustness to double-talk & near-end noise
% which tend to integrate towards zero.
% Larger also improves ability to detect convergence because the correlated
% update grows proportionally with frame size whereas the uncorrelated (noise)
% grows with the square-root of the frame size.
% Smaller improves reaction time to changes (echo path, single -> double talk)
% and speeds up convergence.
% Smaller also improves ability to reject vowel sounds.
% 160 is used for ease of porting to a 160-samples-per-frame TDMA phone.
% The resulting 20 ms frame is nearly optimum for dividing speech into
% stationary-signal segments.
NFRAMES = floor((wordCount/2)/FRAME_SIZE);   % Number of frames to process.
clear wordCount
NSAMPLES = NFRAMES * FRAME_SIZE;   % Length of sample-based vectors for debug.
%
% Load the mic (uplink) and speaker (downlink) VAD outputs from separate
% files. If each file is not found, run the C executable on the near-end and
% far-end sound files, and save the VAD outputs in a file with the same
% prefix.
```

-continued

```
%
fidIn = fopen([inFile '_up_vad'],'r');
if fidIn == -1
   disp(['File = ' inFile '_up_vad not found -- creating ...'])
   fidOut =fopen('vad_in.raw','w');
   fwrite(fidOut, LRmatrix(2,:), 'int16');    % Uplink audio
   fclose(fidOut);
   !nrsim -s=f vad_in.raw junk vad_out.bit
   !rm vad_in.raw
   !rm junk.flt
   fidIn = fopen('vad_out.bit','r');
   if fidIn == -1
      error('Error opening file = vad_out.bit')
   end
   micVad = fread(fidIn, NFRAMES, 'int8');
   !rm vad_out.bit
   fclose(fidIn);
   fidOut =fopen([inFile '_up_vad'],'w');
   fwrite(fidOut, micVad, 'int8');
   fclose(fidOut);
else
   micVad = fread(fidIn, NFRAMES, 'int8');
   fclose (fidIn);
end
fidIn = fopen([inFile '_down_vad'],'r');
if fidIn == -1
   disp(['File = ' inFile '_down_vad not found -- creating ...'])
   fidOut =fopen('vad_in.raw','w');
   fwrite(fidOut, LRmatrix(1,:), 'int16');   % Downlink audio
   fclose(fidOut);
   !nrsim -s=f vad_in.raw junk vad_out.bit
   !rm vad_in.raw
   !rm junk.flt
   fidIn = fopen('vad_out.bit','r');
   if fidIn == -1
      error('Error opening file = vad_out.bit')
   end
   speakerVad = fread(fidIn, NFRAMES, 'int8');
   !rm vad_out.bit
   fclose(fidIn);
   fidOut =fopen([inFile '_down_vad'],'w');
   fwrite(fidOut, speakerVad, 'int8');
   fclose(fidOut);
else
   speakerVad = fread(fidIn, NFRAMES, 'int8');
   fclose(fidIn);
end
% Scale inputs to use range of -1 to ONE.
LRmatrix = LRmatrix / 32768;
% Number of bits to right shift values accumulated over a frame of samples.
FRAME_BITS = ceil(log2(FRAME_SIZE));
% Scale factor to quantize energies to 32 bits (Z8.23 format w/FRAME_SIZE=160)
ENERGY_SCALE = 2 ^ (31-FRAME_BITS);
% Number of taps in the reference delay line.
% It must be long enough that the high-delay taps are mostly uncorrelated with
% the far-end signal and only have near-end energy.
AEC_REF_TAPS = 512;
% Number of taps in the FIR echo-estimation filter.
AEC_COEF_TAPS = 256;
% Number of taps in the high-delay section of the update vector for measuring
% near-end energy.
AEC_NEAR_TAPS = 128;
% Length of vector for capturing car noise samples.
COMFORT_NOISE_SIZE = 128;
% Calculate the threshold on the update vector peak-to-baseline ratio for
% determining the maximum update gain. For noise uniform in the range of
% [-1 1], the expected peak update magnitude is g*FRAME_SIZE/3, while the
% expected RMS of the update vector for the uncorrelated taps is
% g*sqrt(FRAME_SIZE)/3, where g is the echo path gain. Therefore, the maximum
% update vector peak-to-baseline ratio is sqrt(FRAME_SIZE).
% However, voice does not have a constant envelope like noise. Because
% FRAME_SIZE is much smaller than the update vector length, a burst of speech
% will sometimes be in the area of the update vector where the peak is
% measured but not in the area where baseline is measured. Therefore, real
% peak-to-baseline ratios can be extremely high (>300).
% Setting the threshold too low will cause instability due to high-gain
% updates even for low-energy far-end signals under noisy or double-talk
% conditions.
% Setting the threshold too high will cause slow adaptation due to high-gain
```

```
% updates only for high-energy far-end signals after large echo-path changes.
% This threshold was empirically determined as a compromise.
AEC_MAX_GAIN_THRESH = 16;
% The peak-to-RMS for noise is independent of the frame size. This threshold
% for rejecting near-end voice/noise and far-end periodic signals (tones and
% vowels) was empirically derived.
AEC_BASELINE_THRESH = 5.5;
% Pre-calculate the constant to use as a multiplier for the status gauge.
AEC_STATUS_GAUGE_SCALER = floor(32768/...
                                (AEC_MAX_GAIN_THRESH-AEC_BASELINE_THRESH)) / 32768;
% Create the gain profile for the FIR coefs. The profile roughly matches the
% expected range of the coefs in the car. This way, updates containing
% periodic components (vowels) are forced to follow the proper exponential
% decay characteristic and minimize divergence. Lower gain on the higher-
% delay taps also reduces update noise contribution to the coefs. The overall
% effect of the profile is to allow higher update gain without instability.
% Since all coefs have 16-bits of dynamic range, the higher-delay taps also
% have better quantization as a result of the profile. The profile is
% implemented by calculating the FIR 64 taps at a time with a right shift in
% between.
profile=ones(AEC_COEF_TAPS,1);
for k=2:(AEC_COEF_TAPS/64),
   profile((k*64-63):(k*64))=ones(64,1)*2^(1-k);
end
% Allocate debug vectors to speed up execution.
aecUpdateFactor = zeros(1,NFRAMES);
aecChanGainHist = zeros(1,NFRAMES);
aecSpeedHist = zeros(1,NFRAMES);
aecVoiceGainHist = zeros(1,NFRAMES);
aecVoiceGainBaseHist = zeros(1,NFRAMES);
aecNearRatioHist = zeros(1,NFRAMES);
aecNearGainHist = zeros(1,NFRAMES);
aecEchoGainHist = zeros(1,NFRAMES);
aecInNoiseHist = zeros(1,NFRAMES);
aecInEchoNoiseHist = zeros(1,NFRAMES);
aecInVoiceHist = zeros(1,NFRAMES);
aecInEchoVoiceHist = zeros(1,NFRAMES);
anlpInVoiceHist = zeros(1,NFRAMES);
anlpInNoiseHist = zeros(1,NFRAMES);
anlpDeltaHist = zeros(1, NSAMPLES);
anlpGainHist = zeros(1,NFRAMES);
% Initialize variables
aecRef = zeros(1,AEC REF TAPS);                    % To use the last values:
aecCoef = zeros(AEC_COEF_TAPS,1);                  %   Comment out this
aecInNoise = FRAME_SIZE;                           %   Comment out this
aecInEchoNoise = aecInNoise;                       %   Comment out this
anlpInNoise = aecInNoise;                          %   Comment out this
aecChanGain = ONE;                                 %   Comment out this
aecVoiceGain = ONE;                                %   Comment out this
aecVoiceGainBase = aecVoiceGain;                   %   Comment out this
aecNearGain = aecVoiceGain;                        %   Comment out this
aecEchoGain = aecVoiceGain;                        %   Comment out this
anlpComfortNoiseInOld = 0;                         %   Comment out this
anlpComfortNoiseOutOld = 0;                        %   Comment out this
anlpComfortNoise = zeros(1,COMFORT_NOISE_SIZE);    %   Comment out this
anlpArCoef = 0.75;                                 %   Comment out this
aecNearRatio = 0;                      % Init for history only
aecInNoiseStateVars      = [aecInNoise 0 0];
aecInEchoNoiseStateVars = [aecInEchoNoise 0 0];
anlpInNoiseStateVars     = [anlpInNoise 0 0];
anlpSeed = 1;
anlpArGain = 1 - anlpArCoef;
anlpRefEnvelope = 0;
anlpOutLast = 0;
anlpNearSpeechCount = 0;
anlpNearSpeechFlag = 0;
%disp(['aecCoef(1) = ' dec2hex(aecCoef(1)*32768+(aecCoef(1)<0)*65536)])
%disp(['aecCoef(2) = ' dec2hex(aecCoef(2)*32768+(aecCoef(2)<0)*65536)])
%disp(['aecInNoise = ' dec2hex(aecInNoise*2^31)])
%disp(['anlpInNoise = ' dec2hex(anlpInNoise*2^31)])
%disp(['aecChanGain = ' dec2hex(aecChanGain*32768)])
%disp(['aecVoiceGain = ' dec2hex(aecVoiceGain*32768)])
%disp(['aecVoiceGainBase = ' dec2hex(aecVoiceGainBase*32768)])
%disp(['aecEchoGain = ' dec2hex(aecEchoGain*32768)])
%disp(['anlpComfortNoiseInOld = ' dec2hex(anlpComfortNoiseInOld*32768)])
%disp(['anlpComfortNoiseOutOld = ' dec2hex(anlpComfortNoiseOutOld*32768)])
%disp(['anlpArCoef = ' dec2hex(anlpArCoef*2^31)])
%disp(['anlpArGain = ' dec2hex(anlpArGain*32768)])
fidOut = fopen(outFile, 'w');
```

-continued

```
for frame = 1:NFRAMES,
   frame                        % Display the frame number to indicate progress.
   %
   % AEC pre-frame section
   %
   % Since there is a gap between taps of the reference vector which are used
   % to update the FIR coefficients and those used in correlation of near-end
   % energy, the update vector need not be calculated for every tap of the
   % reference vector. Therefore, the update vector is represented by sub-
   % vectors specifically for the two purposes.
   % Clear update sub-vectors which accumulate over a frame.
   aecUpdate = zeros(AEC_COEF_TAPS,1);        % Used for FIR coef update
   aecUpdateNear = zeros(AEC_NEAR_TAPS,1);    % Used for near-end measurement
   % Clear other frame accumulators
   aecEchoEstEnergy = 0;
   % Reset block-floating-point variables.
   aecShiftPending = 0;
   aecErrorShift = 0;
   % Get uplink and downlink PCM audio samples into buffers.
   downlinkAudio = LRmatrix(1, (frame-1)*FRAME_SIZE+1 : frame*FRAME_SIZE);
   uplinkAudio   = LRmatrix(2, (frame-1)*FRAME_SIZE+1 : frame*FRAME_SIZE);
   % Accumulate AEC near-end-input energy over a frame.
   aecInEnergy = sum(uplinkAudio .^ 2);
   % Quantize energy to 32 bits.
   aecInEnergy = floor(aecInEnergy * ENERGY_SCALE) / ENERGY_SCALE;
   %
   % AEC sample section
   %
   for k = 1:FRAME_SIZE,
      % Shift the far-end (loudspeaker) sample into the reference delay line and
      % calculate FIR output.
      % In the DSP, both operations are in one instruction.
      aecRef = [downlinkAudio(k) aecRef(1:AEC_REF_TAPS-1)];
%TEST CODE START
%The following code quickly approximates the commented-out, bit-accurate code.
      aecEchoEst = aecRef(1:AEC_COEF_TAPS) * (aecCoef .* profile);
      aecEchoEst = max(min(round(aecEchoEst * 32768)/32768,ONE) ,-1);
%TEST CODE END
%     aecEchoEst = 0;
%     for m=(AEC_COEF_TAPS/64):-1:2,
%        aecEchoEst = aecEchoEst + aecRef(m*64-63:m*64) * aecCoef(m*64-63:m*64);
%        aecEchoEst = max(min(aecEchoEst,ONE),-1) / 2;
%        % Quantize for S.31 format
%        aecEchoEst = floor(aecEchoEst * 2^31) / 2^31;
%     end
%     aecEchoEst = aecEchoEst + aecRef(1:64) * aecCoef(1:64);
%     aecEchoEst = max(min(aecEchoEst,ONE),-1);
%     % Quantize for S.15 format
%     % Add 2^(-17) to force the 1's complement floating point to act the same
%     % as 2's complement when rounding a negative number with a fraction of
%     % exactly 0.5.
%     aecEchoEst = round(aecEchoEst * 32768 + 2^(-17))/32768;
%     aecEchoEst = max(min(aecEchoEst,ONE),-1);
      % Accumulate echo-estimate energy over a frame.
      % To improve small-signal performance and to make this measurement in the
      % same way as the other energy accumulations, the full 40-bit accumulator
      % is saved between loop passes.
      aecEchoEstEnergy = aecEchoEstEnergy + aecEchoEst^2;
      % Calculate the AEC output = near-end (microphone) input - echo estimate.
      uplinkAudio(k) = max(min(uplinkAudio(k) - aecEchoEst,ONE),-1);
      % Accumulate coef update = correlation of error (uplinkAudio(k)) and
      % reference. Use block floating point representation, where aecErrorShift
      % is the exponent and aecUpdate/aecUpdateNear() is the mantissa.
      T = uplinkAudio(k) * 2^aecErrorShift;
      % Quantize for S.15 format
      T = floor(T * 32768)/32768;
      if aecShiftPending,
         ASM = -1;
         aecErrorShift = aecErrorShift - 1
         aecShiftPending = 0;
      else
         ASM = 0;
      end
      % Calculate for the region used to update the FIR coefficients.
      aecUpdate         = aecUpdate    + T * aecRef(1:AEC_COEF_TAPS)';
      % Calculate for the region used to measure near-end energy.
      aecUpdateNear     = aecUpdateNear + ...
                          T * aecRef(AEC_REF_TAPS-AEC_NEAR_TAPS+1:AEC_REF_TAPS)';
```

-continued

```
% Quantize for S.15 format
% Add 2^(-17) to force the 1's complement floating point to act the same
% as 2's complement when rounding a negative number with a fraction of
% exactly 0.5.
aecUpdate       = round(aecUpdate     * 32768 + 2^(-17))/32768;
aecUpdateNear   = round(aecUpdateNear * 32768 + 2^(-17))/32768;
aecUpdate       = max(min(aecUpdate    ,ONE),-1);
aecUpdateNear   = max(min(aecUpdateNear,ONE),-1);
aecUpdate       = aecUpdate     * 2^ASM;
aecUpdateNear   = aecUpdateNear * 2^ASM;
% Quantize for S.15 format after possible right shift.
aecUpdate       = floor(aecUpdate     * 32768)/32768;
aecUpdateNear   = floor(aecUpdateNear * 32768)/32768;
% Find the peak square of the update vector (assume in first 128 taps).
% The goal is to get the peak absolute value, but the peak square takes
% fewer cycles in the DSP, even with the sqrt at the end of the frame.
aecUpdatePeak2 = max(aecUpdate(1:128).^2);
% Flag indicates if update needs divided by 2 in the next loop.
aecShiftPending = aecUpdatePeak2 > 0.25;   % 0.25 = 0.5^2
end
% Quantize energy for 32-bits.
aecEchoEstEnergy = floor(aecEchoEstEnergy * ENERGY_SCALE) / ENERGY_SCALE;
%
% AEC post-frame section
aecOut = uplinkAudio;     % Save for output to file for debug.
% Accumulate AEC-output energy over a frame.
aecOutEnergy = sum(uplinkAudio .^2);
% Quantize energy for 32-bits.
aecOutEnergy = floor(aecOutEnergy * ENERGY_SCALE) / ENERGY_SCALE;
% The true reference energy is different for each element of the update
% vector. aecUpdate(1) would use the energy from aecRef(1),
% aecUpdate(2) would use the energy from aecRef(2), and so forth. To
% reduce complexity, use a single number to represent the reference energy.
% When the reference energy is used to measure the channel echo gain
% for determining adaptation speed or to normalize the update (NLMS), using
% too small of a value could cause instability. The compromise solution
% implemented here is to use the maximum of the endpoints where profile = 1.
aecRefEnergy = max(sum(aecRef( 1:FRAME_SIZE ) .^2), ...
                   sum(aecRef(64:FRAME_SIZE+63) .^2));
% Quantize for Z8.7 format
aecRefEnergy = floor(aecRefEnergy*128)/128;
% Measure the update baseline as the RMS of the high-delay elements where
% the correlation between the error and far-end signals is expected to be 0.
% Add 1 LSB to the result to ensure aecUpdateBase is greater and
% aecPeakToBase is smaller after quantization. This avoids the false
% impression of higher echo correlation.
% Adding 1 LSB after a floor operation produces the same result as a ceiling
% operation except for the rare case when all the truncated bits equal zero.
aecUpdateBase = sum(aecUpdateNear.^2)/AEC_NEAR_TAPS;
% Quantize squared intermediate result for Z.31 format
aecUpdateBase = floor(aecUpdateBase*2^31)/2^31;
aecUpdateBase = sqrt(aecUpdateBase);
% Quantize for Z.15 format
aecUpdateBase = floor(aecUpdateBase*32768+1)/32768;
% Find the peak magnitude of the update vector.
aecUpdatePeak = sqrt(aecUpdatePeak2);
% Calculate the update peak-to-baseline ratio.
aecPeakToBase = aecUpdatePeak / aecUpdateBase;
% Quantize for Z11.4 format since 4 fractional bits are sufficient.
aecPeakToBase = floor (aecPeakToBase*16)/16;
% Calculate the status gauge (range=(0,ONE]) from the update peak-to-
% baseline ratio. The gauge, used in down-stream processing, stays the same
% even though the peak-to-baseline ratio changes with frame size and the
% baseline threshold could change.
% For near-end voice/noise or far-end periodic signals (vowels), gauge <0.1
%    For example, the first frame of a DTMF tone, with frequencies of 941 Hz
%    and 1209 Hz, was found to produce aecPeakToBase=3.5 and, thus,
%    aecStatusGauge=0).
% For double talk, gauge < 0.3.
% For far-end single talk:
%      gauge = ONE when canceler is grossly unconverged, regardless of noise.
%      If the near-end is quiet, gauge=ONE until near complete convergence.
%      As the canceler converges, only residual echo higher in energy than the
%      near-end noise level causes gauge=ONE.
%      Thus, near-end noise causes fewer updates, not reduced update gain.
aecStatusGauge = (aecPeakToBase - AEC_BASELINE_THRESH) * ...
                 AEC_STATUS_GAUGE SCALER;
aecStatusGauge = max(min(aecStatusGauge,ONE),0);
% Quantize for Z.15 format
```

-continued

```
aecStatusGauge = floor(aecStatusGauge*32768)/32768
% Estimate the noise frame energy at the AEC input.
[confirmedNoVoiceFlag, aecInNoiseStateVars] = estnoise(aecInEnergy, ...
   (micVad( frame)==0) & (aecStatusGauge==0), aecInNoiseStateVars);
aecInNoise = aecInNoisestateVars(1);
aecInNoise                              % Display for status
aecInNoiseHist(frame) = aecInNoise;     % Save for debug
% Estimate the echo gain at the AEC input (channel gain).
% Update the estimate only during far-end single talk
% (speakerVad(frame) == 1) & (aecStatusGauge > 0.3), when the ratio is
% accurate despite that the reference measurement includes voice and noise
% while the AEC input measurement includes only voice (aecInvoice >
% aecInNoise*8), and when reference energy is not significantly affected by
% quantization (aecRefEnergy >= 10/128). The instantaneous gain measurement
% is not very accurate because of time misalignment and spectrum variations.
% Therefore, an averaging process is used. The norm of the echo canceler
% filter coefficients is an excellent long-term estimate of the channel
% gain. However, it does not track a changing echo path quickly enough.
% Also, since the channel gain estimate controls the adaptation speed of the
% linear echo canceler, stability is improved if the estimate is independent
% of the linear echo canceler as much as possible. Thus, the following
% scheme is used:
% If the instantaneous measurement (aecChanGainTrial) is less than the
% estimate (aecChanGain), pump the estimate down exponentially.
% To speed adaptation, the estimate is set directly to the instantaneous
% measurement if the error is greater than 50%, and the estimate is pumped
% down proportionally if the error is greater than 12.5%, i.e.,
% (aecChanGain−aecChanGainTrial)/4 > aecChanGain/32 for
% aecChanGain−aecChanGainTrial > aecChanGain/8 = aecChanGain*0.125.
% If the instantaneous measurement is greater than the estimate, pump the
% estimate up exponentially only if the measurement is not clearly dominated
% by near-end voice (aecChanGainTrial < 2). It would not work to use a
% relative comparison such as (aecChanGainTrial < 2*aecChanGain) because
% no update would occur when the true channel gain jumps quickly.
% Using a pump-up time constant that is 1/8 of the pump-down time constant
% helps tolerate near-end voice in the instantaneous measurement.
% It is difficult to tell the difference between near-end speech and when
% channel echo gain gets worse. The pump-up time constant here
% determines the tracking rate, and it was empirically determined.
aecInVoice = max(0, aecInEnergy−aecInNoise);
aecInVoiceHist(frame) = aecInVoice;
if   (speakerVad(frame) == 1) & (aecStatusGauge > 0.3) & ...
     (aecInVoice > aecInNoise*8) & (aecRefEnergy >= 10/128),
   % Quantize aecInVoice to 4Z8.20 format for use as dividend to get the
   % desired scale for the quotient.
   aecChanGainTrial = floor(aecInVoice *2^20)/2^20 / aecRefEnergy;
   % Quantize and limit quotient to Z2.13 format
   aecChanGainTrial = min(4*ONE, floor(aecChanGainTrial *2^13)/2^13);
   % Calculate the square root of the quotient.
   aecChanGainTrial = sqrt (aecChanGainTrial);
   % Quantize root to Z1.14 format
   aecChanGainTrial = floor(aecChanGainTrial *2^14)/2^14;
   if (aecChanGainTrial < aecChanGain/2),
      aecChanGain = aecChanGainTrial;
   elseif (aecChanGain > aecChanGainTrial),
      aecChanGain = aecChanGain − ...
                    max ((aecChanGain−aecChanGainTrial)/4, aecChanGain/32);
   elseif (aecchanGainTrial < 2*ONE),
      aecChanGain = min(ONE, aecChanGain + max(aecChanGain/256, 2^(−11)));
   end
   % Quantize for Z.15 format
   aecChanGain = floor(aecChanGain*32768)/32768;
   % Save for debug
   aecChanGainHist( frame) = aecChanGainTrial;
else
   aecChanGainHist(frame) = ONE;
end
aecChanGain                             % Display for status
aecSpeedHist(frame) = aecChanGain;      % Save for debug
% Determine the update gain.
% Use NLMS to make the adaptation speed constant (independent of far-end
% signal amplitude) as long as the gain is less than or equal to ONE.
% Using the max function results in faster convergence than adding 1 to
% the denominator because the resulting gain is higher.
% Using the maximum of the AEC reference and near-end-input energies limits
% the normalizing gain when there is near-end noise and/or voice. The AEC
% output energy is not used instead of the AEC near-end-input energy because
% higher gain is not desired after convergence, and because stability is
% improved by not using another parameter based on the AEC output to control
```

-continued

```
% the AEC update gain. aecInEnergy should be less than aecRefEnergy with no
% near-end voice or noise in order to avoid microphone overload (since the
% microphone gain is set according to the loudest near-end speech level).
% The energy multiplier is set to 8 if we are sure there is far-end single
% talk with low near-end noise (aecInEnergy/16 >= aecOutEnergy). Otherwise,
% it is set to 16. Thus, adaptation is faster when the car is quiet.
% A too-small energy multiplier results in less stability, causing
% overshoots in the adaptation and spikes in the echo canceler output.
% The overshoots also hinder differentiation between far-end single talk,
% with a changing echo path, and near-end speech.
% A too-large multiplier increases echo gain shortly after a perturbation.
% In the numerator, use the gauge to vary the gain according to the
% conditions. Also, use the channel echo gain as a multiplier to
% optimize adaptation speed to the channel. Without this multiplier,
% adaptation is either slower than necessary for high channel
% gain or unstable for low channel gain. Using the norm
% of the adaptive filter coefficients instead of the energy-based channel
% gain results in a more accurate and consistent estimate in the
% long term, but speed and stability would be compromised in the short term
% after an echo path change.
if (aecInEnergy/16 >= aecOutEnergy),
   aecDenom = max(1, 8 * max(aecRefEnergy, aecInEnergy));
   % For debug, set the factor equal to the negative gauge value.
   aecUpdateFactor( frame) = -aecStatusGauge;
else
   aecDenom = max(1, 16 * max(aecRefEnergy, aecInEnergy));
   % For debug, set the factor equal to the gauge value.
   aecUpdateFactor( frame) = aecStatusGauge;
end
% Quantize for Z12.3 format
aecDenom = floor(8 * aecDenom)/8;
aecNumer = aecChanGain * aecStatusGauge;
% Quantize for 22Z.18 format
aecNumer = floor(aecNumer *2^18)/2^18;
aecUpdateGain = min(aecNumer / aecDenom, ONE);
% Quantize for Z.15 format
aecUpdateGain = floor (aecUpdateGain*32768)/32768;
% Add the update vector to the coefficient vector using the adaptive gain.
% aecCoef is multiplied by profile before use as FIR coefficients.
aecCoef = aecCoef + (aecUpdate * 2^(-aecErrorShift) * aecUpdateGain);
% Quantize for S.15 format
% Add 2^(-17) to force the 1's complement floating point to act the same
% as 2's complement when rounding a negative number with a fraction of
% exactly 0.5.
aecCoef = round(aecCoef * 32768 + 2^(-17))/32768;
aecCoef = max(min(aecCoef,ONE),-1);
% The noise suppresser would go here and process uplinkAudio.
% By using aecUpdate and aecUpdateNear only within one subroutine, they can
% be in temporary memory, available for overlay.
%
% ANLP pre-frame section
%
% Accumulate energy at the ANLP input, which is connected through the noise
% suppresser to the AEC output.
anlpInEnergy = sum(uplinkAudio .^2);
% Quantize energy to 32 bits.
anlpInEnergy = floor(anlpInEnergy * ENERGY_SCALE) / ENERGY_SCALE;
% Estimate the noise frame energy at the ANLP input.
% Use speakerVad since the echo estimate comes from the loudspeaker signal.
[confirmedNoVoiceFlag, anlpInNoiseStateVars] = estnoise(anlpInEnergy, ...
   (micVad(frame)==0) & (aecStatusGauge==0), anlpInNoiseStateVars);
anlpInNoise = anlpInNoiseStateVars(1);
anlpInNoiseHist(frame) = anlpInNoise;           % Save for debug
% Calculate the comfort noise when no voice is confirmed.
if confirmedNoVoiceFlag,
   anlpComfortNoise = uplinkAudio(1:COMFORT_NOISE_SIZE);
   % Use the NLMS algorithm to estimate anlpArCoef in the first-order
   % ARMA noise model of the form:
   %         (1 - anlpArCoef)*(1 + 0.8125*Z^-1)/(1 - anlpArCoef*Z^-1).
   % This ARMA model will be used to filter white noise to get noise that
   % sounds like the car noise.
   % The NLMS algorithm tries to minimize the following expression:
   %         error = uplinkAudio * (1 - anlpArCoef*Z^-1)/(1 + 0.8125*Z^-1).
   % The correlation between error and uplinkAudio*Z^-1 is the update
   % to the coefficient estimate.
   % anlpInEnergy is used to normalize the update gain to provide an
   % adaptation rate independent of level. Calculate the non-zero
   % denominator outside the loop to save MIPS.
   anlpDenom = 4 * max(1/128, floor(anlpInEnergy*128)/128);
```

-continued

```
      error = 0;
      for i=2:FRAME_SIZE,
          error = - 0.8125 * error;
          % Quantize for 5S4.31 format (maximum of 10 * uplinkAudio)
          error = floor(error * 2^31)/2^31;
          error = error + uplinkAudio(i-1:i) * [-anlpArCoef; 1];
          quotient = uplinkAudio(i-1:i-1) * floor(error * 2^12)/2^12 / anlpDenom;
          quotient = max(min(quotient,ONE),-1);
          % Quantize for S.15 format
          quotient = floor(quotient * 32768)/32768;
          anlpArCoef = anlpArCoef + quotient;
          anlpArCoef = max(min(anlpArCoef,ONE),-1);
      end
      anlpArGain = 1 - anlpArCoef;
      % Plot the frequency response of the comfort noise for debug.
%     plot((0:8191)/8192*4000,...
%         20*log10(abs(freqz(anlpArGain*[1 0.8125],[1 -anlpArCoef],8192))))
%     axis([0 4000 -40 10])
%     pause(1)
  end
  % Estimate the noise frame energy of the echo at the AEC input.
  % Use speakerVad since the echo estimate comes from the loudspeaker signal.
  [confirmedNoVoiceFlag, aecInEchoNoiseStateVars] = estnoise(...
      aecEchoEstEnergy, (speakerVad(frame)==0) & (aecStatusGauge==0), ...
      aecInEchoNoiseStateVars);
  aecInEchoNoise = aecInEchoNoiseStateVars(1);
  aecInEchoNoiseHist(frame) = aecInEchoNoise;       % Save for debug
  test1Hist(frame) = aecInEchoNoiseStateVars(2);    % Save for debug
  test2Hist(frame) = aecInEchoNoiseStateVars(3);    % Save for debug
  aecInEchoNoiseStateVars                            % Display for status
  % Estimate the voice energy estimates. Don't let them go below zero.
  aecInEchoVoice = max(0, aecEchoEstEnergy - aecInEchoNoise);
  aecInEchoVoiceHist(frame) = aecInEchoVoice;
  aecNearVoice = max(0, aecInVoice - aecInEchoVoice);
  anlpInVoice = max(0, anlpInEnergy - anlpInNoise);
  anlpInVoiceHist(frame) = anlpInVoice;
  % Leak upward the linear-echo-canceler baseline echo-gain estimate.
  % It is used for comparison to the instantaneous echo gain to detect
  % near-end speech and for the ANLP gains during near-end speech.
  % It leaks upward fast enough to track when the instantaneous
  % echo gain gets worse. The leakage was empirically determined as a
  % compromise between fast tracking to avoid false detection of near-end
  % speech during far-end single talk with a changed echo path and minimizing
  % distortion of near-end voice/noise during far-end voice/noise.
  % When far-end single talk starts after the echo path has changed,
  % aecNearGain can go down, go up somewhat, and then go way down. If
  % aecNearGain goes up sufficiently above aecVoiceGainBase, near-end speech
  % will be detected. If this happens, the leakage on aecVoiceGainBase can be
  % increased to prevent this. A leakage constant of 5/4096 was empirically
  % found to provide sufficient tracking speed. However, increased leakage
  % reduces detection of near-end speech during double talk.
  aecVoiceGainBase = min(aecVoiceGainBase + 1/8192, ONE);
  % Measure the linear-echo-canceler voice gain, excluding the channel.
  % Including the channel gain would make near speech detection unreliable.
  % Compute the root of the ratio of voice energy at the output and input of
  % the linear echo canceler.
  % This raw measurement is not conditional as to whether the voice comes from
  % the near end, far end, or both.
  % The output of the linear echo canceler is taken at the ANLP input because
  % the signal has passed through the noise suppresser, making measurements
  % more accurate. Measurement by means of energy includes the loudspeaker
  % distortion in the echo, which cross correlation does not. Also, comparing
  % energies at the input and output of the echo canceler avoids time-
  % alignment issues that arise when comparing the echo-canceler output to the
  % reference (due to the delay of the channel).
  % Measure gain only when not corrupted by quantization (aecInvoice > 8/2^7),
  % when voice is present (aecInvoice > aecInNoise*8),
  % and when residual echo is measurable (anlpInVoice > anlpInNoise/2).
  % The accuracy of the measurement is not reduced by periodic components
  % in the far-end signal.
  if   (aecInVoice > max(8/2^7, aecInNoise*8)) & ...
       (anlpInVoice > anlpInNoise/2),
      aecVoiceGain = min(ONE, sqrt(anlpInVoice / (floor(aecInVoice*2^7)/2^7)));
      % Quantize for Z.15 format
      aecVoiceGain = floor(aecVoiceGain*32768)/32768;
      % Measure the ratio of near-end voice to total voice.
      % This produces fewer false indications of near-end voice due to a
      % changing echo path with far-end single talk because it only relies on
      % the energy of the echo estimate, not how well the echo is canceled at
```

```
% the output. However, like aecVoiceGain, false indications of near-end
% voice are likely when the canceler is grossly untrained.
% The usual ratio would include a square root since the voice measurements
% are in energy units. However, greater differentiation is achieved
% between near-end voice and poor canceler training by using the energy
% ratio directly. This also saves MIPS.
aecNearRatio = min(ONE, aecNearVoice / (floor(aecInVoice*2^7)/2^7));
% Quantize for Z.15 format
aecNearRatio = floor(aecNearRatio*32768)/32768;
% Measure the linear-echo-canceler baseline echo-gain estimate during far-
% end speech. Measure whenever far-end single talk could exist
% (aecStatusGauge > 0.1) to make sure the parameter tracks the true echo
% gain (not noise). Otherwise, echo may be heard. Update the
% baseline echo-gain estimate when the voice gain is lower than the
% baseline estimate because this indicates a high probability of far-end
% single talk. By using leakage and not letting the baseline track the
% voice gain when it is higher than the baseline, the baseline is very
% robust against noise and near-end speech.
if (aecStatusGauge > 0.1),
    aecVoiceGainBase = min(aecVoiceGainBase, aecVoiceGain);
end
% Measure the linear-echo-canceler voice gain during near-end
% speech, and reset during far-end single talk (take minimum with voice
% gain). This will be used for comparison against the voice gain
% baseline to detect double talk. The only indicators available that
% near-end speech may be occuring are that the echo canceler gauge is low
% (aecStatusGauge < 0.3) and that the echo canceler output contains
% sufficient energy that the voice is likely not just residual echo
% (anlpInVoice > anlpInNoise*8). Remember that the gauge could be low due
% to periodic components in the far-end speech. Therefore, extra means
% are necessary to differentiate between when voice gain gets
% suddenly worse due to a change in the echo path or loudspeaker
% distortion and when there is near-end speech. When voice gain
% gets suddenly worse during far-end single talk, the duration tends to be
% rather short. Therefore, filtering the increases in this parameter
% usually rejects far-end single-talk incidents. The filter time constant
% is a compromise between far-end single-talk rejection and double-talk
% recognition speed, and it was empirically determined.
aecNearGainLast = aecNearGain;
aecNearGain = min(aecNearGain, aecVoiceGain);
if (aecStatusGauge < 0.3) & (anlpInvoice > anlpInNoise*8),
    aecNearGain = aecNearGain + (aecVoiceGain-aecNearGain)/8;
    % Quantize for Z.15 format
    aecNearGain = floor(aecNearGain*32768)/32768;
end
% Use any of three detection methods for near-end speech. Each
% method is more sensitive to near-end speech under certain conditions.
% All detection occurs only when the total voice is sufficiently greater
% than an absolute level or the noise floor to reject conditions where
% only noise is present.
%
% Method 1.
% (aecInEchoVoice < aecInVoice/4) is equivalent to (aecNearRatio >= 0.75)
% but the former is less sensitive to quantization. Spikes on
% aecNearRatio are common for low levels of far-end single talk.
% Therefore, the threshold must be high to avoid false detection. The
% only qualifiers needed for this detection method is that the status
% gauge = 0 and the voice gain baseline be below 0.4625 = 15155/32768.
% The latter threshold is an empirical compromise between avoiding false
% detection when the canceler is grossly untrained and detecting double
% talk as soon as possible after the canceler starts training.
%
% Method 2.
% (aecInVoice > 32/2^7 & anlpInVoice > anlpInNoise*8) rejects low-level
% voice. By doing so, the detection can be more sensitive to lower ratios
% of near-end voice to total voice. Again, accepting conditions only when
% the status gauge = 0 helps reject far-end single talk. The sensitivity
% to near-end speech is optimized by varying the threshold with
% aecVoiceGainBase. The scale factor and offset is an empirical
% compromise between avoiding false detection when the canceler is grossly
% untrained and being as sensitive as possible to near-end speech after
% the canceler starts training.
%
% Method 3.
% Comparing aecNearGain with aecVoiceGainBase detects near-end speech when
% echo suppression gets suddenly and consistently worse. This is because
% aecVoiceGainBase does not react to sudden changes, and aecNearGain uses
% a filter to ensure consistency in the detection. Because of the filter
% used for computing aecNearGain, conditions are more relaxed, which
```

-continued

```
    % allows greater sensitivity to near-end speech. Such conditions include
    % having the status gauge < 0.3 rather than = 0, and having no increased
    % minimum absolute level for the voice. When far-end single talk starts
    % after the echo path has changed, aecNearGain can fall but still stay
    % above aecVoiceGainBase for a short time. To avoid audible echo in this
    % case, near-end speech is only detected when aecNearGain is greater than
    % its last value.
    if    ((aecStatusGauge == 0) & (aecInEchoVoice < aecInVoice/4) & ...
          (aecVoiceGainBase < 15155/32768)) | ...
          ((aecStatusGauge == 0) & (aecInVoice > 32/2^7) & ...
          (anlpInVoice > anlpInNoise*8) & ...
          (aecNearRatio − aecVoiceGainBase*1.5 >= 9830/32768)) | ...
          ((aecNearGain − aecVoiceGainBase >= 6554/32768) & ...
          (aecNearGain > aecNearGainLast)),
        % Near-end speech has been detected.
        % If this frame begins a new period of near-end speech (the hang time
        % has expired and the last frame containing voice was only echo),
        % then set the linear-echo-canceler echo gain equal to the baseline
        % echo-gain estimate. This is done only at the beginning of a near-end
        % speech period so that the residual-echo suppresser has consistent
        % attenuation during the near-end speech rather than increasing
        % distortion as the baseline leaks upward while getting no updates.
        if (anlpNearSpeechCount == 0) & (anlpNearSpeechFlag == 0),
            aecEchoGain = aecVoiceGainBase;
        end
        % Set the flag indicating that the last frame with voice contained
        % near-end speech. It will remain set during frames where voice is not
        % detected.
        anlpNearSpeechFlag = 1;
        % Restart the near-end-speech hang-time counter. When non-zero, it will
        % override anlpNearSpeechFlag to minimize distortion by the residual-
        % echo suppresser of near-end speech during double talk or when the
        % voice energy is too low to be detected.
        % If this counter were to start only when far-end single talk was
        % detected, there would be less cut-out of near-end speech during double
        % talk. However, the far-end person would hear echo every time he/she
        % started to speak after the near-end person spoke, even after a long
        % pause.
        % When there is a quick transition from near-end speech to far-end
        % single talk (such as when the near-end person talks in the middle of
        % the far-end person's speech), the hang time will cause a short period
        % where the far-end person hears echo (at −25 dB). This artifact is
        % worthwhile because of the significant reduction in cut-out during
        % double-talk gained by the hang time.
        anlpNearSpeechCount = 25;              % 25 * 20 ms = 500 ms hangtime.
    end
end
% If the echo-estimate voice energy is at least 15/16 the near-end voice
% energy, assume that this frame contains far-end echo speech only, and
% clear the near-end speech flag. If the near-end-speech hang-time counter
% has already expired, the residual-echo suppresser will immediately go to
% far-end single-talk mode. Otherwise, the residual-echo suppresser will go
% to far-end single-talk mode when the near-end-speech hang-time counter
% expires. Note that near-end speech could be detected again while the
% counter is in progress, and then the residual-echo suppresser will stay in
% near-end speech mode once the counter expires.
% This detection scheme compares 32-bit numbers and does not use any
% qualifiers based on the energy levels, the status gauge, or measurements
% from previous frames (besides the noise estimates). Therefore, the scheme
% is rather sensitive yet robust. Were this scheme to fail to detect far-
% end speech, the far-end person would hear echo when he/she started to
% speak after the near-end person spoke, even after a long pause.
if (aecInEchoVoice > (aecInvoice − aecInvoice/16)),
    anlpNearSpeechFlag = 0;
end
% If the near-end-speech hang-time counter has expired, and the last frame
% containing voice was only echo, then set the linear-echo-canceler echo
% gain equal to the last-measured linear-echo-canceler voice gain. This
% assumes that no near-end speech is present, so the residual-echo
% suppresser will attempt to suppress all of the voice. This test is after
% that which clears anlpNearSpeechFlag so that aecEchoGain will reflect the
% decision immediately.
if (anlpNearSpeechCount == 0) & (anlpNearSpeechFlag == 0),
    aecEchoGain = aecVoiceGain;
end
aecVoiceGainHist(frame) = aecVoiceGain;             % Save for debug
aecVoiceGainBase                                    % Echo for status
aecVoiceGainBaseHist(frame) = aecVoiceGainBase;     % Save for debug
aecEchoGain                                         % Echo for status
```

-continued

```
aecEchoGainHist(frame) = aecEchoGain;                % Save for debug
aecNearRatioHist(frame) = aecNearRatio;              % Save for debug
aecNearGainHist(frame) = aecNearGain;                % Save for debug
anlpNearSpeechCount                                   % Echo for status
anlpNearSpeechFlag                                    % Echo for status
% Calculate the loop echo gain up to the ANLP. The ANLP will attenuate as
% needed to meet the total loop echo suppression goal for the system.
% ? is through the volume control.
% aecChanGain is from the loudspeaker to the microphone -- the channel.
% aecEchoGain is from the input to the output of the linear echo canceler.
aecLoopEchoGain = aecChanGain * aecEchoGain;   % Insert volume gain here.
% Quantize for Z.15 format
aecLoopEchoGain = floor(aecLoopEchoGain*32768)/32768
% Set the ANLP window size to capture the expected residual echo, but no
% more. This minimizes distortion on near-end voice and noise. The ANLP
% window size shrinks as the AEC improves its echo gain, so use aecChanGain
% and aecEchoGain to control the window size. The volume-control gain is
% not used because the envelope-detector input for the ANLP comes after the
% volume control. The echo gain estimates measure in an RMS sense, but the
% ANLP needs to suppress the entire residual echo including peaks. Thus,
% use a peak-to-RMS factor multiplier (= 3). The dynamic range of
% anlpWindowGain is two because, when the linear echo canceler is grossly
% untrained, anlpWindowGain needs to be at least two to capture the echo
% within the window.
anlpWindowGain = min(2*ONE, 3 * aecChanGain * aecEchoGain);
% Quantize for Z1.14 format
anlpWindowGain = floor(anlpWindowGain*16384)/16384;
% If the VAD indicates that there only noise on the loudspeaker, then put
% the ANLP in a pass-through mode (gain = ONE). The VAD allows high-quality
% near-end single talk because there is no distortion of the near-end speech
% or noise. The VAD will often say that there is voice when there is only
% noise, so other means are necessary to minimize distortion of the near-end
% speech or noise in this case. Also, the VAD will infrequently say that
% there is only noise when there is a low level of voice. The problem is
% somewhat proportional to the noise level on the loudspeaker. However,
% having the linear echo canceler in the loop provides enough echo
% suppression to make the echo inaudible in these cases.
if speakerVad(frame) == 0,              % Near-end single-talk condition.
    anlpEchoGain = ONE;
% Since speakerVad=1, the loudspeaker most likely has speech, but not
% necessarily. If near-end speech is detected, assume double talk. In this
% case, set the total loop echo suppression goal to -25 dB (1843/32768), and
% set the ANLP gain to the needed echo suppression not provided in the rest
% of the loop. The ANLP gain is higher (the suppression is lower) and
% distortion is reduced as the customer turns down the volume from full
% scale. When the linear echo canceler is trained, the ANLP gain is
% typically higher than -10 dB in this mode, so noise masking does not
% improve the sound quality. The far-end user will hear some echo during
% double talk, but this artifact is preferable to cut-out or high distortion
% of the near-end voice.
elseif (anlpNearSpeechCount > 0) | (anlpNearSpeechFlag == 1),   % Double-talk
    anlpEchoGain = 1843/32768 / aecLoopEchoGain;
% Since speakerVad=1 and near-end speech is not detected, assume there is
% far-end single talk. The total loop echo suppression goal is -56 dB
% (52/32768) so that echo is almost inaudible when both ends have quiet
% backgrounds. As in double-talk mode, the ANLP gain is set to the needed
% echo suppression not provided in the rest of the loop, and the ANLP gain
% is higher and distortion is reduced as the customer turns down the volume
% from full scale and as the linear echo canceler trains. However, the
% gain needed to attenuate the echo to inaudibility below the noise floor
% may be higher, so the higher of the two gains is used for the ANLP to
% minimize distortion. Without the comfort noise, attenuating both the
% echo and the noise by the same factor would not change the signal-to-noise
% ratio; so noise masking would not work. The comfort noise makes it such
% that the noise at the input and output of the ANLP are the same level.
% Therefore, the ANLP can attenuate the echo to the threshold of audibility
% below the noise floor, without distorting more than necessary. The square
% root is taken of the ratio of noise to voice because these variables are
% in units of energy. Multiplying the desired echo-to-noise ration by the
% actual noise-to-echo ratio will factor out the noise. What is left the
% desired-to-actual echo ratio, which is the gain needed to mask the echo.
else                                    % Far-end single-talk condition.
    ECHO_TO_NOISE_GOAL = 1/8;           % -18 dB
    if (anlpInvoice > anlpInNoise),
        anlpEchoGain = max(52/32768 / aecLoopEchoGain, ...
                           ECHO_TO_NOISE_GOAL * sqrt(anlpInNoise/anlpInVoice));
    else
        % Under noisy conditions, the gain doesn't exceed ECHO_TO_NOISE_GOAL,
        % even though theoretically it could for low-energy voice, because the
```

```
        % noise estimate is too large as the noise level falls quickly (car
        % slows down). This causes echo to be heard when the ANLP echo gain is
        % too high.
        anlpEchoGain = max(52/32768 / aecLoopEchoGain, ECHO_TO_NOISE_GOAL);
    end
end
anlpEchoGain = min(ONE, anlpEchoGain);
% Quantize for Z.15 format
anlpEchoGain = floor(anlpEchoGain*32768)/32768
anlpGainHist(frame) = anlpEchoGain;                 % Save for debug
% Decrement the near-speech hang counter, if need be, so that it works
% independently of the loudspeaker VAD.
anlpNearSpeechCount = max(0, anlpNearSpeechCount - 1);
%
% ANLP sample section
%
% If the ANLP echo gain is ONE, the ANLP is inactive -- skip to save MIPS.
if (anlpEchoGain == ONE),
    % Keep the envelope detector running.
    for k = 1:FRAME_SIZE,
        anlpRef = aecRef(FRAME_SIZE-k+1);
        anlpRefEnvelope = max(abs(anlpRef), 255/256 * anlpRefEnvelope);
        anlpRefEnvelope = floor(anlpRefEnvelope*2^31)/2^31;
    end
    % Update the variable used by the AC-center attenuator to be the same as
    % what would result from processing the whole frame.
    anlpOutLast = uplinkAudio(FRAME_SIZE);
else
    for k = 1:FRAME_SIZE,
        % ANLP far-end ref = AEC ref. Using aecEchoEst instead or in addition
        % gives no better results because aecEchoEst is rather unrelated to the
        % residual echo. The AEC ref works equally well since
        % it precedes the earliest echo contained in anlpIn. The long time
        % constant in the peak detector is a key to this ANLP, and it makes
        % close delay matching of anlpRef to the residual echo unnecessary.
        % The offset into the AEC ref delay line can be changed to compensate
        % for fixed delays in the echo path due to upsampling, downsampling,
        % buffers, and/or minimum channel delay.
        anlpRef = aecRef(FRAME_SIZE-k+1);
        % Envelope detect (peak detect) anlpRef signal.
        % The exponential decay of the peak detector models the decay of the
        % reverberation in the car. The time constant is set to handle the most
        % slowly-decaying reverberation condition expected.
        % A pole less than 255/256 results in echo getting through.
        % A pole greater than 255/256 results in excess distortion to near-end.
        anlpRefEnvelope = max(abs(anlpRef), 255/256 * anlpRefEnvelope);
        % anlpRefEnvelope should be 32 bits for storage.
        % anlpRefEnvelope rounded to 16 bits would not decay lower than
        % 512/2^15. anlpRefEnvelope truncated to 16 bits would decay 1 bit per
        % sample when below 256/2^15, and this is too fast (resulting in echo
        % let through).
        % Quantize for Z.31 format
        anlpRefEnvelope = floor(anlpRefEnvelope*2^31)/2^31;
        % ANLP's Delta value is gain controlled by the AEC and limited to ONE.
        anlpDelta = min(ONE, ...
                        anlpwindowGain * floor(anlpRefEnvelope*32768/32768));
        % Quantize for Z.15 format
        anlpDelta = floor(anlpDelta*32768)/32768;
        anlpDeltaHist((frame-1)*FRAME_SIZE+k) = anlpDelta;    % Save for debug
        %
        % Execute AC-center attenuator.
        %
        % The ANLP input is connected to AEC output via the noise suppresser.
        anlpIn = uplinkAudio(k);
        % If the input is below the window,
        if (anlpOutLast - anlpIn) >= anlpDelta,
            % Use all of signal outside window and attenuate signal within window.
            anlpOutLast = anlpIn + anlpDelta - ...
                          anlpEchoGain * anlpDelta;
        % Else if the input is above the window,
        elseif (anlpIn - anlpOutLast) >= anlpDelta,
            % Use all of signal outside window and attenuate signal within window.
            anlpOutLast = anlpIn - anlpDelta + ...
                          anlpEchoGain * anlpDelta;
```

-continued

```
      % Else the input is inside the window.
      else,
          % Attenuate the signal.
          anlpOutLast = anlpEchoGain * (anlpIn - anlpOutLast) + anlpOutLast;
      end
      % Quantize for S.15 format
      anlpOutLast = floor(anlpOutLast*32768)/32768;        % Save for next time.
      %
      % Add comfort noise such that the ANLP output noise has the same level
      % and a similar spectrum as the car noise input to the ANLP.
      %
      % Use random samples from a frame of captured noise from the car.
      % This produces white noise at the same power as the car noise even if
      % the captured audio from the car accidently contains voice.
      anlpSeed = rem(48271 * anlpSeed, 2147483647);
      anlpComfortNoiseIn = anlpComfortNoise(1 + ...
          rem(anlpSeed,COMFORT_NOISE_SIZE));
      % Filter the white noise using the ARMA model discussed above.
      % The following is equivalent, assuming anlpArGain = 1 - anlpArCoef.
      % anlpComfortNoiseOut = anlpArCoef * anlpComfortNoiseOutOld + ...
      %     anlpArGain * (anlpComfortNoiseIn + 0.8125*anlpComfortNoiseInOld);
      ma = anlpComfortNoiseIn + 0.8125*anlpComfortNoiseInOld; % Moving Average
      maDiff = anlpComfortNoiseOutOld - ma;
      % Quantize for S1.15 format
      % Rounding is necessary to avoid a bias on the comfort noise.
      % Add 2^(-17) to force the 1's complement floating point to act the same
      % as 2's complement when rounding a negative number with a fraction of
      % exactly 0.5.
      maDiff = round(maDiff * 32768 + 2^(-17))/32768;
      anlpComfortNoiseOut = ma + anlpArCoef * maDiff;
      % Quantize for S.15 format
      % Rounding is necessary to avoid a bias on the comfort noise.
      anlpComfortNoiseOut = round(anlpComfortNoiseOut*32768 + 2^(-17))/32768;
      anlpComfortNoiseOut = max(-1, min(ONE, anlpComfortNoiseOut));
      % Delay varables for next loop.
      anlpComfortNoiseInOld = anlpComfortNoiseIn;
      anlpComfortNoiseOutOld = anlpComfortNoiseOut;
      % Limit the comfort noise to the window size.
      anlpComfortNoiseOut = min(anlpDelta, ...
                                   max(-anlpDelta, anlpComfortNoiseOut));
      % Scale the comfort noise so that the ANLP output noise equals the ANLP
      % input noise in level.
      anlpComfortNoiseOut = anlpComfortNoiseOut * (ONE - anlpEchoGain);
      % Quantize for S.15 format
      anlpComfortNoiseOut = floor(anlpComfortNoiseOut * 32768) / 32768;
      % Add comfort noise to ANLP output signal.
      uplinkAudio(k) = max(-1, min(ONE, anlpOutLast + anlpComfortNoiseOut));
   end
end
% Save to the file outputs collected over a frame in integer format.
fwrite(fidOut, [uplinkAudio; aecOut]*32768, 'int16');
%disp(['aecInEnergy = ' dec2hex(aecInEnergy * ENERGY_SCALE)])
%disp(['aecErrorShift = ' dec2hex(aecErrorShift+(aecErrorShift<0)*65536)])
%disp(['aecUpdate(1) = ' dec2hex(aecUpdate(1)*32768+(aecUpdate(1)<0)*65536)])
%disp(['aecUpdate(2) = ' dec2hex(aecUpdate(2)*32768+(aecUpdate(2)<0)*65536)])
%disp(['aecUpdateNear(1) = ' ...
%      dec2hex(aecUpdateNear(1)*32768+(aecUpdateNear(1)<0)*65536)])
%disp(['aecUpdateNear(2) = ' ...
%      dec2hex(aecUpdateNear(2)*32768+(aecUpdateNear(2)<0)*65536)])
%disp(['aecUpdatePeak2 = ' dec2hex(aecUpdatePeak2*2^31)])
%disp(['aecOutEnergy = ' dec2hex(aecOutEnergy * ENERGY_SCALE)])
%disp(['aecRefEnergy = ' dec2hex(aecRefEnergy*128)])
%disp(['anlpInEnergy = ' dec2hex(anlpInEnergy * ENERGY_SCALE)])
%disp(['aecUpdateBase = ' dec2hex(aecUpdateBase*32768)])
%disp(['aecUpdatePeak = ' dec2hex(aecUpdatePeak*32768)])
%disp(['aecPeakToBase = ' dec2hex(aecPeakToBase*16)])
%disp(['aecStatusGauge = ' dec2hex(aecStatusGauge*32768)])
%disp(['aecInNoise = ' dec2hex(aecInNoise*2^31)])
%disp(['anlpInNoise = ' dec2hex(anlpInNoise*2^31)])
%disp(['anlpComfortNoise(1) = ' ...
%      dec2hex(anlpComfortNoise(1)*32768+(anlpComfortNoise(1)<0)*65536)])
%disp(['anlpComfortNoise(2) = ' ...
%      dec2hex(anlpComfortNoise(2)*32768+(anlpComfortNoise(2)<0)*65536)])
%disp(['anlpArCoef = ' dec2hex(anlpArCoef*2^31)])
%disp(['anlpArGain = ' dec2hex(anlpArGain*32768)])
%disp(['aecChanGainTrial = ' dec2hex(aecChanGainTrial*?)])
%disp(['aecChanGain = ' dec2hex(aecChanGain*32768)])
%disp(['aecVoiceGainBase = ' dec2hex(aecVoiceGainBase*32768)])
%disp(['aecVoiceGain = ' dec2hex(aecVoiceGain*32768)])
```

-continued

```
%disp(['aecEchoGain ' dec2hex(aecEchoGain*32768)])
%disp(['aecDenom = ' dec2hex(aecDenom*8)])
%disp(['aecNumer = ' dec2hex(aecNumer*2 18)])
%disp(['aecUpdateGain = ' dec2hex(aecUpdateGain*32768)])
%disp(['aecCoef(1) = ' dec2hex(aecCoef(1)*32768+(aecCoef(1)<0)*65536)])
%disp(['aecCoef(2) = ' dec2hex(aecCoef(2)*32768+(aecCoef(2)<0)*65536)])
%disp(['anlpWindowGain = ' dec2hex(anlpWindowGain*16384)])
%disp(['anlpEchoGain = ' dec2hex(anlpEchoGain*32768)])
%disp(['anlpEchoGain = ']); 20*log10(anlpEchoGain)
%disp(['anlpComfortNoiseInOld = ' dec2hex(anlpComfortNoiseInOld*32768)])
%disp(['anlpComfortNoiseOutOld = ' dec2hex(anlpComfortNoiseOutOld*32768)])
%disp(['uplinkAudio(1) = ' ...
%      dec2hex(uplinkAudio(1)*32768+(uplinkAudio(1)<0)*65536)])
%disp(['uplinkAudio(2) = ' ...
%      dec2hex(uplinkAudio(2)*32768+(uplinkAudio(2)<0)*65536)])
%pause
%plot([abs(aecUpdate)/aecUpdateBase; ...
%     zeros(AEC_REF_TAPS - AEC_REF_TAPS - AEC_NEAR_TAPS, 1); ...
%     abs(aecUpdateNear)/aecUpdateBase])
%axis([0 AEC_REF_TAPS 0 aecPeakToBase+0.1])
%xlabel('Update element'),ylabel('Normalized update magnitude'),pause
%plot(20*log10(abs(aecCoef .* profile))),axis([0 AEC_COEF_TAPS -100 1]);
%xlabel('Coefficient number'),ylabel('Magnitude in dB'),pause
end
fclose(fidOut);
clear AEC_MAX_GAIN_THRESH AEC_BASELINE_THRESH AEC_STATUS_GAUGE_SCALER ONE
clear AEC_COEF_TAPS AEC_NEAR_TAPS AEC_REF_TAPS
clear FRAME_SIZE FRAME_BITS ENERGY_SCALE COMFORT_NOISE_SIZE
clear confirmedNoVoiceFlag
clear LRmatrix downlinkAudio uplinkAudio aecRef aecUpdate aecUpdateNear aecOut
clear frame m k i anlpSeed aecEchoEst aecShiftPending aecErrorShift ASM T
clear aecRefEnergy aecInEnergy aecOutEnergy anlpInEnergy aecEchoEstEnergy
clear anlpIn anlpRef anlpRefEnvelope anlpDelta anlpOutLast
clear aecUpdatePeak2 aecUpdatePeak aecUpdateBase aecPeakToBase
clear aecStatusGauge aecDenom aecNumer aecUpdateGain aecLoopEchoGain
clear aecInNoiseStateVars aecInEchoNoiseStateVars anlpInNoiseStateVars
clear aecInVoice anlpInVoice aecInEchoVoice aecNearVoice
clear aecNearRatio aecNearGainLast anlpEchoGain
clear aecChanGainTrial anlpComfortNoiseIn anlpComfortNoiseOut
clear aecPeakGain anlpWindowGain anlpDenom anlpArGain error quotient ma
clear fidIn fidOut anlpNearSpeechCount anlpNearSpeechFlag ECHO_TO_NOISE_GOAL
% Estimate the noise frame energy based on the frame energy of a signal.
% A norm-based noise estimate provides a wider dynamic range with 32-bit
% variables, and thus the operation remains consistent even at very low noise
% levels (such as the far end of test_65.raw). However, the norm-based algo
% requires square-root and 32-bit-square operations (more MIPS). This energy-
% based algo has been optimized for quantization of low noise levels, and it
% does an acceptable job -- especially considering that noise level estimation
% is not critical for very low noise levels (voice is always much larger than
% the noise). It also turns out that adaptation speeds can be made the same
% for the norm-based and energy-based algos. All pumping operations here use
% shifts -- just shift one more bit for the norm-based algo.
%
% The goal is to update the estimate quickly when there is no speech in the
% signal and slowly otherwise. Constant adaptation is needed to track the car
% noise as it changes rapidly. The voice-activity detector (VAD) output is a
% good start for determining when to update quickly, but it sometimes
% indicates no voice when there really is a low level of voice which is much
% higher than the noise. noVoiceFlag is the VAD output qualified by the
% status gauge of the linear echo canceler to improve the reliability.
% However, the status gauge does not differentiate noise from near-end speech,
% double-talk, or tones. Therefore, the algorithm must to tolerant of some
% speech during the fast update period. Where the status gauge works well is
% during far-end single talk, which is where it is most important for the
% noise estimate to be accurate to avoid audible echo. The trick used here to
% reduce false deviations (primarily occurring during near-end speech) is to
% pump the estimate up and down at fixed rates based on comparison results
% rather than linearly filter the energy signal. Using a pump-up time
% constant that is 1/4 of the pump-down time constant biases the estimate
% toward the noise floor in spite of some voice. Pumping up and down by fixed
% increments instead of fixed time constants would result in a time constant
% that changes with noise level.
%
% It is difficult to tell the difference between a rising noise floor and
% speech. The pump-up time constants here determines the tracking rate.
% However, the pump-up is necessarily slow to minimize false growth during
% speech. State machines are implemented to allow a faster increase in the
% noise estimate under certain conditions. If the state machine sees the
% signal energy greater than 8 times the noise estimate for at least 900 ms
```

-continued

```
% during no voice, it is assumed that the noise floor has increased, and the
% noise floor is set equal to the test noise estimate from test period.
% When the input noise is dominated by noise from the far end, blanking due
% to the AMPS in-band control channel or due to poor RF conditions will
% cause the noise floor to temporarily drop. The state machine attempts to
% restore the noise estimate after blanking. First confirm that the energy
% drop is between 5 and 25 frames long. Then confirm that the energy returns
% back to the original level. If the energy remains within a window around
% the original noise level, a relatively short confirmation period is needed.
% If the energy jumps much higher than the original level, then voice could be
% occuring, and a longer confirmation period is needed to ensure that the
% noise floor has not dropped.
%
% Definition of noiseStateVars array:
%    (1) = noise estimate
%    (2) = noise estimate from before blanking or test noise estimate
%    (3) = state variable/counter
function [confirmedNoVoiceFlag, noiseStateVars] = ...
         estnoise(inEnergy, noVoiceFlag, noiseStateVars)
% Define the needed constants in the same way as the parent routine.
% The number of samples in the update integration period.
FRAME_SIZE = 160;
% Number of bits to right shift values accumulated over a frame of samples.
FRAME_BITS = ceil(log2(FRAME_SIZE));
% Scale factor to quantize energies to 32 bits (Z8.23 format w/FRAME_SIZE=160)
ENERGY_SCALE = 2^(31-FRAME_BITS);
% If the parent rountine has initialized the noise estimate,
if noiseStateVars(1) == FRAME_SIZE,
   %
   % Take actions to speed up adaptation for the beginning of a call.
   %
   % Set the flag so that the comfort noise will initialize with this level.
   confirmedNoVoiceFlag = 1;
   % Start with the noise estimate equal to the energy.
   noiseStateVars(1) = inEnergy;
else
   %
   % Update the noise estimate.
   %
   % By default, clear the flag so as to indicate no comfort noise training.
   confirmedNoVoiceFlag = 0;
   %
   % The following bias test was performed in Matlab on white noise:
   % >>n =160*3000;noise=zeros(1,m);
   % >>seed=1;for i=1:n,[noise(i) seed]=noisegen(seed);end
   % >>m=3000;for i=1:m,noiseEnergy(i)=sum(noise(160*(i-1)+1:160*i).^2);end
   % >>ne=100;for i=1:m,if ne>noiseEnergy(i),
   % >>ne=ne-ne/16;else,ne=ne+ne/64;end,neh(i)=ne;end
   % >>plot(neh)            % neh is the noise estimate history.
   % >>axis([0 20 0 100])   % Notice that neh settles after 10 frames.
   % >>1/(sum(neh(11:m))/(m-10)/(sum(noiseEnergy)/m)-1)
   % ans = -14.2082
   % This indicates that the noise estimate has a bias factor of about -1/14.
   % To simplify arithmetic, subtract a factor of 1/16 from the noise estimate
   % for comparison purposes to restore the bias.
   % In assembly, right shift before subtraction for bit exactness.
   noiseBiased = noiseStateVars(1) - noiseStateVars(1)/16;
   % Quantize to 32 bits
   noiseBiased = ceil(noiseBiased*ENERGY_SCALE)/ENERGY_SCALE;
   %
   % If the VAD and status gauge indicate no voice,
   if noVoiceFlag,
      %
      % Pump the noise estimate quickly.
      %
      % If the noise estimate is too high,
      if noiseBiased > inEnergy,
         %
         % Pump the noise estimate down.
         %
         % To speed up tracking with a decreasing noise floor, it was tried to
         % set the noise estimate equal to the signal energy immediately if the
         % noise estimate was too high by a factor of 8. However, this made the
         % bias very negative when activated, and it created problems with false
         % detections. The time constant is so short that pumping the noise
         % estimate down instead works quite well.
         %
         % To minimize the deviation, don't pump down when the noise estimate
         % equals the signal energy.
```

```
        %
        % Quantization causes a minimum change of 1/ENERGY_SCALE, except at 0.
        % In assembly, negate before right shift for bit exactness.
        noiseStateVars(1) = noiseStateVars(1) - noiseStateVars(1)/16;
        % Set the flag for comfort noise training. Requiring that the input
        % energy be lower than the noise estimate improves the probability that
        % comfort noise is not updated during voice.
        confirmedNoVoiceFlag = 1;
     else
        %
        % Pump the noise estimate up.
        %
        % Use a minimum increment to avoid getting stuck near zero.
        % Adding min(noiseStateVars(1)/64, 1/ENERGY_SCALE) is not used instead
        % because it results in slower adaptation to suddenly increased noise.
        noiseStateVars(1) = noiseStateVars(1) + noiseStateVars(1)/64 + ...
                            1/ENERGY_SCALE;
     end
  else
     %
     % Pump the noise estimate slowly.
     %
     % Adaptation is not stopped during voice because of the importance of
     % accurately tracking a decreasing noise floor. Over-estimation of the
     % noise causes under-estimation of the voice energy. This has more of an
     % impact on the NLP input than the linear echo canceler input due to the
     % lower far-end voice energy. Thus, the result is insufficient echo
     % suppression. So it is better to under-estimate than over-estimate the
     % noise.
     %
     % If the noise estimate is too high,
     if noiseBiased > inEnergy,
        %
        % Pump the noise estimate down.
        %
        % Quantization causes a minimum change of 1/ENERGY_SCALE, except at 0.
        % In assembly, negate before right shift for bit exactness.
        noiseStateVars(1) = noiseStateVars(1) - noiseStateVars(1)/64;
     else
        %
        % Pump the noise estimate up.
        %
        % At first glance, it may seem that only pumping down during voice is
        % necessary to accurately track a decreasing noise floor. However, this
        % will cause the bias to become too strongly negative. The pump up rate
        % was empirically determined to be the fastest possible while not
        % allowing too much of a false change during voice. This turns out to
        % be very slow since voice can last for several seconds between pauses.
        % Don't use a minimum increment or else the ramp up will be too
        % large for low noise levels during voice.
        noiseStateVars(1) = noiseStateVars(1) + noiseStateVars(1)/1024;
     end
  end
% Quantize to 32 bits
noiseStateVars(1) = floor(noiseStateVars(1)*ENERGY_SCALE)/ENERGY_SCALE;
%
% State machine for AMPS blanking and noise jump tracking.
% Don't execute at initialization.
%
% If the state machine is in the idle state,
if noiseStateVars(3) == 0,
  % If the signal energy has significantly dropped below the noise estimate,
  % and if quantization of inEnergy does not give false results,
  if noiseStateVars(1) > max(8*inEnergy, 8/ENERGY_SCALE),
     % Store the noise estimate for the state machine.
     noiseStateVars(2) = noiseStateVars(1);
     % Start the state machine to look for blanking.
     noiseStateVars(3) = 1;
  % If the VAD and status gauge indicate no voice, and the signal energy is
  % significantly higher than the noise estimate, and if quantization of
  % the noise estimate does not give false results,
  elseif noVoiceFlag & ...
         (inEnergy > max(8*noiseStateVars(1), 8/ENERGY_SCALE)),
     % Initialize the test noise estimate.
     noiseStateVars(2) = inEnergy;
     % Start the state machine to look for a noise jump.
     noiseStateVars(3) = -1;
  end
```

-continued

```
% Else if the state machine is looking for a noise jump,
elseif noiseStateVars(3) < 0,
    % If the VAD and status gauge continue to indicate no voice, and if the
    % signal energy remains significantly higher than the noise estimate,
    if noVoiceFlag & (inEnergy > 8*noiseStateVars(1)),
        % Bias the test noise estimate just like the regular one.
        % In assembly, right shift before subtraction for bit exactness.
        noiseBiased = noiseStateVars(2) − noiseStateVars(2)/16;
        % Quantize to 32 bits
        noiseBiased = ceil(noiseBiased*ENERGY_SCALE)/ENERGY_SCALE;
        % If the test noise estimate is too high,
        if noiseBiased > inEnergy,
            % Pump the test noise estimate down.
            % Quantization causes a minimum change of 1/ENERGY_SCALE.
            % In assembly, negate before right shift for bit exactness.
            noiseStateVars(2) = noiseStateVars(2) − noiseStateVars(2)/16;
        else
            % Pump the test noise estimate up.
            noiseStateVars(2) = noiseStateVars(2) + noiseStateVars(2)/64;
        end
        % Quantize to 32 bits
        noiseStateVars(2) = floor(noiseStateVars(2)*ENERGY_SCALE)/ENERGY_SCALE;
        % Decrement the state variable which also acts as a counter.
        noiseStateVars(3) = noiseStateVars(3) − 1;
        % If the signal energy has remained significantly higher than the noise
        % estimate for a sufficient period,
        % (45 frames are needed for the echo of test track s_top10_1.raw)
        if noiseStateVars(3) == −45,
            % Jump the noise estimate to the test noise estimate.
            noiseStateVars(1) = noiseStateVars(2);
            % Reset the state machine back to the idle state.
            noiseStateVars(3) = 0;
        end
    else,
        % Reset the state machine back to the idle state.
        noiseStateVars(3) = 0;
    end
% Else the state machine is looking for blanking.
else,
    % Increment the state variable.
    noiseStateVars(3) = noiseStateVars(3) + 1;
    % States 1–100 count the number of frames in the alleged blanking period.
    if noiseStateVars(3) < 101,
        % If the energy goes back high,
        if 8*inEnergy > noiseStateVars(2),
            % If the blanking is less than 5 frames,
            if noiseStateVars(3)−1 < 5,
                % Either the detection was false or it is not worth restoring the
                % noise estimate. Put the state machine back into idle state.
                noiseStateVars(3) = 0;
            else
                % Voice has occured or the noise has returned after blanking.
                % Set the state variable to 101 to start the next phase.
                noiseStateVars(3) = 101;
            end
        % If the count of low energy frames is too long,
        elseif noiseStateVars(3)−1 == 25,
            % Blanking did not occur -- the noise floor dropped instead.
            % Put the state machine back into idle state.
            noiseStateVars(3) = 0;
        end
    % The state machine has detected the end of the alleged blanking period.
    % Regardless of whether the state machine is counting frames of voice or
    % noise, first check if the energy goes back low.
    elseif 8*inEnergy < noiseStateVars(2),
        % Blanking did not occur -- the noise floor dropped instead.
        % Put the state machine back into idle state.
        noiseStateVars(3) = 0;
    % States 101–200 count the number of frames of voice or noise following
    % the alleged blanking period.
    elseif noiseStateVars(3) < 201,
        % If the energy is goes very high,
        if inEnergy > noiseStateVars(2)*8,
            % Assume that this is voice.
            % Set the state variable to 201 to start the next phase.
            noiseStateVars(3) = 201;
        % If there is a sufficient count of frames where the maximum and minimum
        % energy is close to the saved noise estimate,
        elseif noiseStateVars(3)−101 == 10,
```

```
            % The blanking is confirmed.
            % Restore the noise estimate to that before the blanking.
            noiseStateVars(1) = noiseStateVars(2);
            % Put the state machine back into idle state.
            noiseStateVars(3) = 0;
         end
      % States 201–300 count the number of frames of voice following
      % the alleged blanking period.
      %
      % If there is a sufficient count of frames where the minimum
      % energy is close to the saved noise estimate,
      elseif noiseStateVars(3)–201 == 50,
         % The blanking is confirmed.
         % Restore the noise estimate to that before the blanking.
         noiseStateVars(1) = noiseStateVars(2);
         % Put the state machine back into idle state.
         noiseStateVars(3) = 0;
      end
   end
end
```

Figure 7:
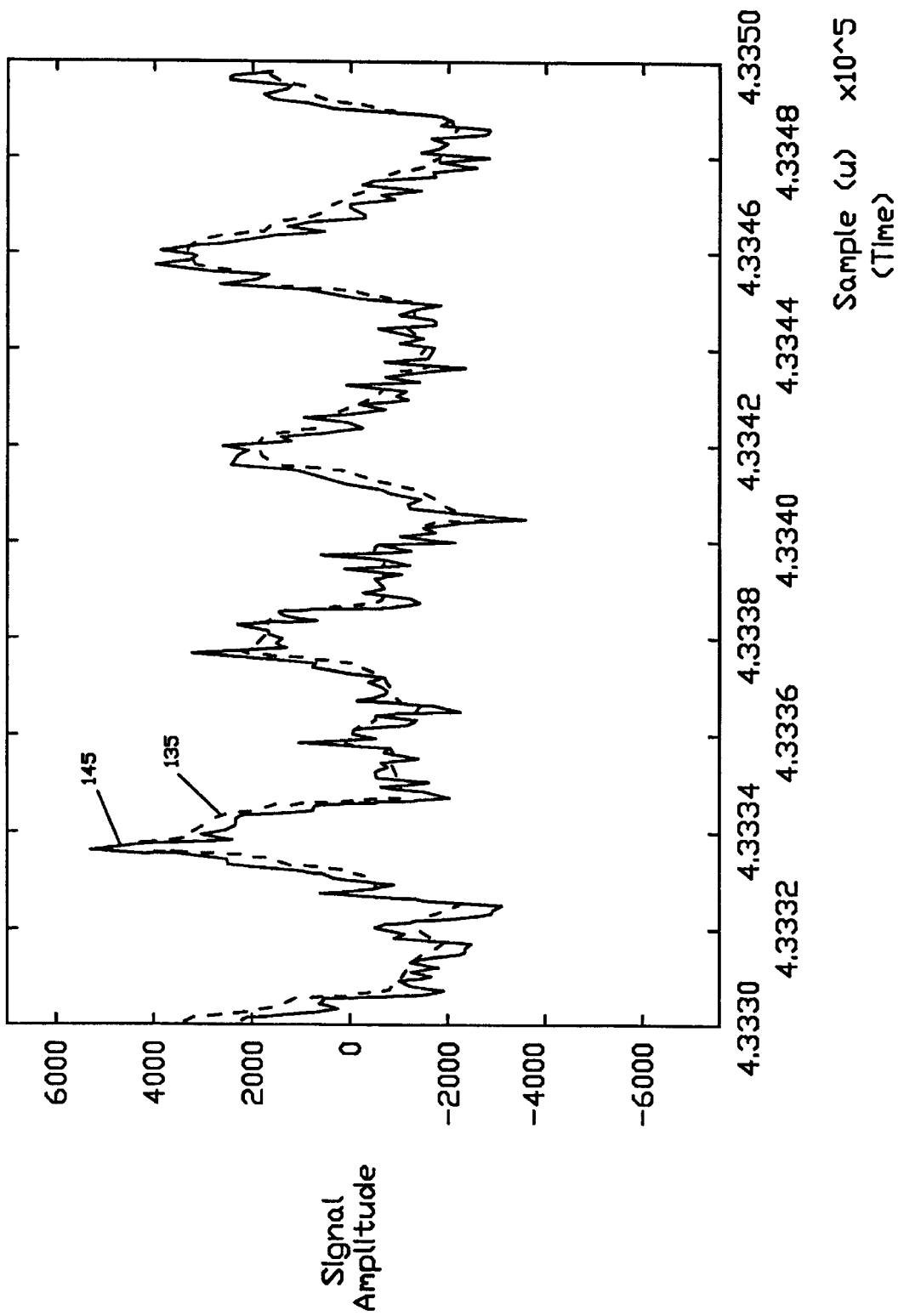
FIG. 7 depicts exemplary audio signals which demonstrate operation of the echo suppression system of FIG. 5.
Figure 8:
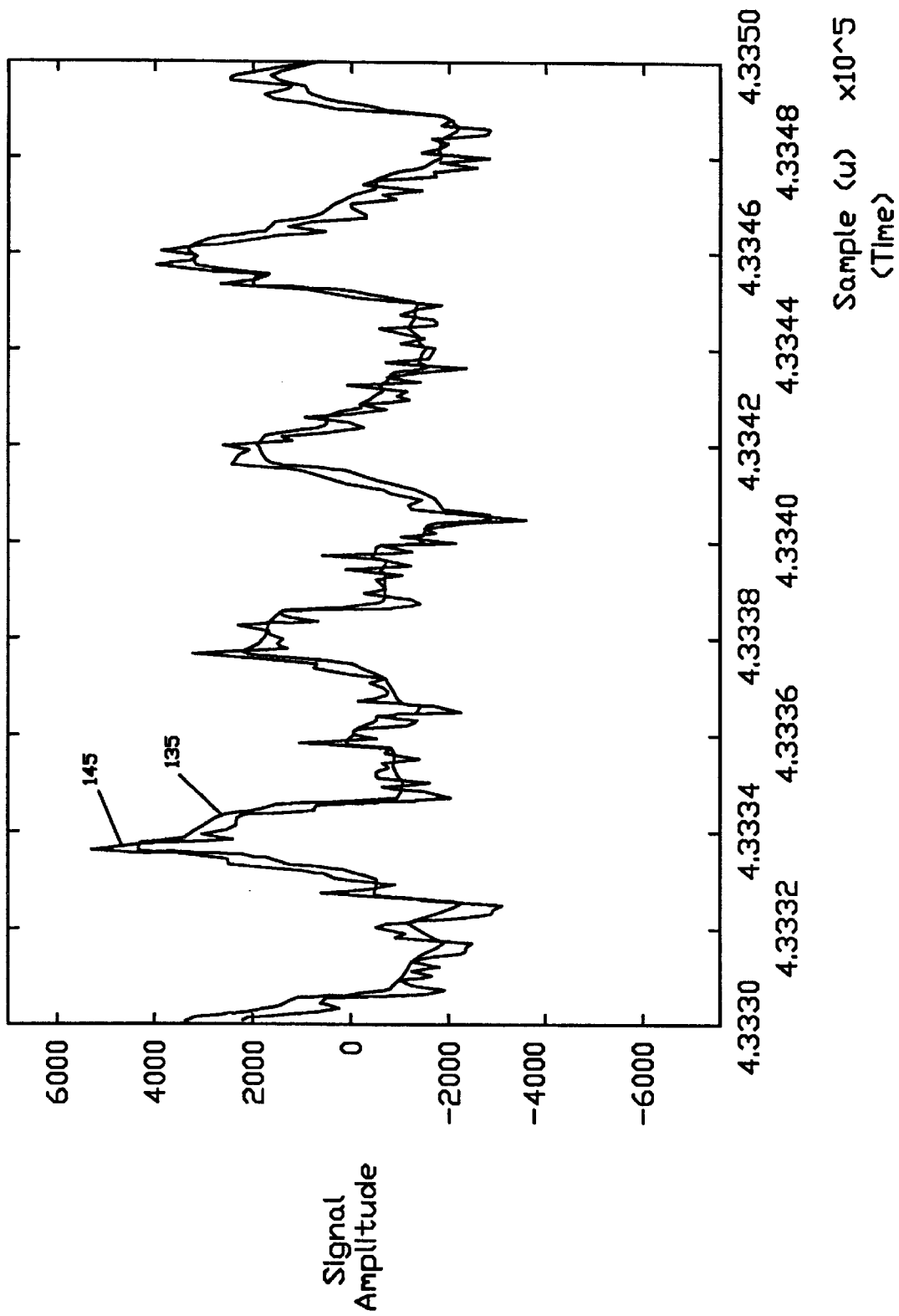
FIG. 8 provides an alternative representation of the exemplary audio signals of FIG. 7.

FIGS. 7 and 8 depict sample audio signals generated via the pseudo-code above and are intended to illuminate operation of the AC-center attenuator of the present invention. Specifically, FIG. 7 depicts an example of the audio input to the AC-center attenuator 130 (e.g., signal 145 in FIG. 5) and a corresponding example of the audio output of the AC-center attenuator 130 (e.g., signal 135 in FIG. 5). In FIG. 7, the exemplary AC-center attenuator input signal is shown as a solid line 145, and the corresponding AC-center attenuator output signal is shown as a dashed line 135. FIG. 8 then depicts both of the audio signals of FIG. 7 as solid lines 135, 145 so that detail lost by using a dashed line for the attenuator output signal 135 in FIG. 7 can be seen. As shown, the exemplary audio input signal 145 includes a relatively high-frequency, low-amplitude echo component superimposed on a relatively low-frequency, high-amplitude noise component. Such a signal is encountered frequently in practice (e.g., during far-end single talk with a noisy near-end background) and can be difficult to process using conventional echo suppressors. As shown, however, the AC-center attenuator provides an audio output 135 in which the echo component is largely suppressed while the noise component remains as desired.

Those skilled in the art will appreciate that the present invention is not limited to the specific exemplary embodiments which have been described herein for purposes of illustration. For example, the various operational blocks of the disclosed embodiments are conceptual in nature. Actual implementation of the functions of such blocks can be accomplished using a variety of techniques. Furthermore, each exemplary system can be implemented, for example, using multiple standard digital signal processing chips, a single application-specific integrated circuit, or an appropriately configured computer.

Note also that, although the exemplary embodiments have been described in the context of acoustic echo canceling, the teachings of the present invention are equally applicable in the context of network echo canceling (e.g., where the near-end user is a landline user and the far-end user is a mobile user). Further, certain aspects of the present invention are applicable to communications systems generally and are not limited to echo suppression systems. Thus, the scope of the invention is defined by the claims which are appended hereto, rather than the foregoing description, and all equivalents which are consistent with the meaning of the claims are intended to be embraced therein.

What is claimed is:

1. A signal echo processing device, comprising:
an input node configured to receive an input signal; and
a signal processor coupled to said input node and configured to process said input signal to provide an output signal,
wherein said signal processor scales a first portion of said input signal and passes a second portion of said input signal to provide said output signal,
wherein said first portion of said input signal is selected using an attenuation window of said signal processor, and
wherein a center of said attenuation window is adjusted in accordance with a value of said input signal.

2. A signal processing device according to claim 1, wherein said center of said attenuation window is adjusted in accordance with a signed amplitude of said input signal.

3. A signal processing device according to claim 1, wherein said center of said attenuation window is adjusted recursively such that, at each instant in time, said center is equal to a previously computed value of said output signal.

4. A signal processing device according to claim 1, wherein said center of said attenuation window is made to decay toward zero when said input signal is within said attenuation window.

5. A signal processing device according to claim 1, wherein said center of said attenuation window is limited such that said attenuation window cannot exceed a full-scale range of said input signal.

6. A signal processing device according to claim 1, wherein said signal processor scales said first portion of said input signal using an adjustable attenuation factor.

7. A signal processing device according to claim 1, wherein a size of said attenuation window is adjustable.

8. An echo suppression device, comprising:
an echo suppressor configured to process a first communications signal in order to suppress an echo component thereof, said echo component resulting from a reflection of a second communications signal,
wherein said echo suppressor scales a first portion of said first communications signal and passes a second portion of said first communications signal to provide an echo-suppressed output signal,
wherein said first portion of said first communications signal is selected using an attenuation window of said echo suppressor, and wherein a center of said attenuation window is adjusted in accordance with a value of said first communications signal.

9. An echo suppression device according to claim 8, wherein said center of said attenuation window is adjusted in accordance with a signed amplitude of said first communications signal.

10. An echo suppression device according to claim 8, wherein said center of said attenuation window is adjusted recursively such that, at each instant in time, said center is set equal to a previously computed value of said echo-suppressed output signal.

11. An echo suppression device according to claim 8, wherein said center of said attenuation window is made to decay toward zero when said first communications signal is within said attenuation window.

12. An echo suppression device according to claim 8, wherein said center of said attenuation window is limited such that said attenuation window cannot exceed a full-scale range of said first communications signal.

13. An echo suppression device according to claim 8, wherein said echo suppressor scales said first portion of said first communications signal using an adjustable attenuation factor.

14. An echo suppression device, according to claim 13, wherein said attenuation factor is adjusted such that the echo suppression device provides echo attenuation based on echo attenuation provided by other devices within a communications system in which said echo suppression device is implemented.

15. An echo suppression device according to claim 14, wherein said attenuation factor is adjusted based on a volume control signal which is used to adjust a volume of an audio output of said communications system.

16. An echo suppression device according to claim 8, wherein a size of said attenuation window is adjustable.

17. An echo suppression device according to claim 16, wherein said size of said attenuation window is adjusted based on said second communications signal.

18. An echo suppression device according to claim 16, wherein said size of said attenuation window is adjusted based on echo attenuation provided by other devices within a communications system in which said echo suppression device is implemented.

19. An echo suppression device according to claim 18, wherein said size of said attenuation window is adjusted based on a volume control signal which is used to adjust a volume of an audio output of said communications system.

20. An echo suppression device, comprising:
 an echo suppressor configured to process an echo-containing input signal and an echo-causing reference signal in order to provide an echo-suppressed output signal; and
 a gain control processor configured to estimate an echo gain of said echo suppressor,
 wherein said estimate is computed based on a ratio of first and second measurements,
 wherein said first measurement indicates energy in said echo-suppressed output signal, and
 wherein said second measurement indicates energy in one of said echo-containing input signal and said echo-causing reference signal.

21. An echo suppression device according to claim 20, wherein said first measurement is derived as a square root of a sum of squares of samples of said echo-suppressed output signal.

22. An echo suppression device according to claim 20, wherein said first measurement is derived as a root-mean-square value of samples of said echo-suppressed output signal.

23. An echo suppression device according to claim 20, wherein said second measurement is derived as a square root of a sum of squares of samples of one of said echo-containing input signal and said echo-causing reference signal.

24. An echo suppression device according to claim 20, wherein said second measurement is derived as a root-mean-square value of samples of one of said echo-containing input signal and said echo-causing reference signal.

25. An echo suppression device according to claim 20, wherein said estimate is computed as a square root of said ratio of said first and second measurements, wherein said first measurement is derived as a sum of squares of samples of said echo-suppressed output signal, and wherein said second measurement is derived as a sum of squares of samples of one of said echo-containing input signal and said echo-causing reference signal.

26. An echo suppression device according to claim 20, wherein said echo suppressor is an adaptive echo canceler.

27. An echo suppression device according to claim 26, wherein said echo suppression device includes a residual echo suppressor and wherein said estimate of the echo gain of said adaptive echo canceler is used to adjust echo attenuation provided by said residual echo suppressor.

28. An echo suppression device according to claim 26, wherein said echo suppression device includes a residual echo suppressor and wherein said estimate of the echo gain of said adaptive echo canceler is used to adjust a size of an attenuation window of said residual echo suppressor.

29. An echo suppression device, comprising:
 a front-end echo suppressor configured to process an echo-containing signal and an echo-causing signal in order to provide an intermediate signal;
 a residual echo suppressor configured to selectively attenuate said intermediate signal to provide an echo-suppressed output signal; and
 a gain control processor configured to estimate an echo gain of said front-end echo suppressor, wherein said estimate is computed based on a ratio of first and second measurements, and wherein said estimate is used to adjust echo attenuation provided by said residual echo suppressor.

30. An echo suppression device according to claim 29, wherein said first measurement is derived as a square root of a sum of squares of samples of said intermediate signal.

31. An echo suppression device according to claim 29, wherein said first measurement is derived as a root-mean-square value of samples of said intermediate signal.

32. An echo suppression device according to claim 29, wherein said second measurement is derived as a square root of a sum of squares of samples of one of said echo-containing signal and said echo-causing signal.

33. An echo suppression device according to claim 29, wherein said second measurement is derived as a root-mean-square value of samples of one of said echo-containing signal and said echo-causing signal.

34. An echo suppression device according to claim 29, wherein said estimate is computed as a square root of said ratio of said first and second measurements, wherein said first measurement is derived as a sum of squares of samples of said intermediate signal, and wherein said second measurement is derived as a sum of squares of samples of one of said echo-containing signal and said echo-causing signal.

35. An echo suppression device, comprising:

an echo canceler configured to process an echo-containing input signal and an echo-causing reference signal in order to provide an echo-canceled output signal, wherein said echo canceler includes one or more adaptive filter coefficients; and a gain control processor configured to estimate an echo gain of said echo canceler, wherein said estimate is computed based on a ratio of first and second measurements, wherein said first measurement indicates a change in at least one of said adaptive filter coefficients during a time interval, and wherein said second measurement is based on one of said echo-containing input signal and said echo-causing reference signal during said time interval.

36. An echo suppression device according to claim 35, wherein said first measurement is derived as a peak of measured changes in said filter coefficients during said time interval.

37. An echo suppression device according to claim 35, wherein said first measurement is derived as a square root of a sum of squares of measured changes in said filter coefficients during said time interval.

38. An echo suppression device according to claim 35, wherein said second measurement is derived as a square root of a sum of squares of samples of one of said echo-containing input signal and said echo causing reference signal.

39. An echo suppression device according to claim 35, wherein said second measurement is derived as a root-mean-square value of samples of one of said echo-containing input signal and said echo causing reference signal.

40. An echo suppression device according to claim 35, wherein said echo suppression device includes a residual echo suppressor and wherein said estimate of the echo gain of said adaptive echo canceler is used to adjust echo attenuation provided by said residual echo suppressor.

41. An echo suppression device according to claim 35, wherein said echo suppression device includes a residual echo suppressor and wherein said estimate of the echo gain of said adaptive echo canceler is used to adjust a size of an attenuation window of said residual echo suppressor.

42. An echo suppression device, comprising:

an echo canceler configured to process an echo-containing signal and an echo-causing signal in order to provide an echo-canceled signal, wherein said echo canceler includes one or more adaptive filter coefficients;

a residual echo suppressor configured to selectively attenuate said echo-canceled signal to provide an echo-suppressed signal; and a gain control processor configured to estimate an echo gain of said echo canceler, wherein said estimate is computed based on a ratio of first and second measurements, wherein said first measurement indicates a change in at least one of said adaptive filter coefficients during a time interval, and wherein said estimate is used to adjust echo attenuation provided by said residual echo suppressor.

43. An echo suppression device according to claim 42, wherein said first measurement is derived as a peak of measured changes in said filter coefficients during said time interval.

44. An echo suppression device according to claim 42, wherein said first measurement is derived as a square root of a sum of squares of measured changes in said filter coefficients during said time interval.

45. An echo suppression device according to claim 42, wherein said second measurement is derived as a square root of a sum of squares of samples of one of said echo-containing input signal and said echo causing reference signal.

46. An echo suppression device according to claim 42, wherein said second measurement is derived as a root-mean-square value of samples of one of said echo-containing input signal and said echo causing reference signal.

47. An echo suppression device according to claim 42, wherein said ratio is computed as a square root of said first and second measurements, wherein said first measurement is derived as a sum of squares of measured changes in said filter coefficients during said time interval, and wherein said second measurement is derived as a sum of squares of samples of one of said echo-containing input signal and said echo causing reference signal.

* * * * *